US010910954B1

(12) United States Patent
Shah et al.

(10) Patent No.: US 10,910,954 B1
(45) Date of Patent: Feb. 2, 2021

(54) POWER SAVING TECHNIQUE IN DETACH CONDITION FOR USB-POWER DELIVERY WITH INTEGRATED SYNCHRONOUS RECITIFIER CONTROLLER

(71) Applicant: Cypress Semiconductor Corporation, San Jose, CA (US)

(72) Inventors: Pulkit Shah, Bangalore (IN); Karri Rajesh, Visakhapatnam (IN); Arun Khamesra, Bangalore (IN); Hariom Rai, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 16/705,509

(22) Filed: Dec. 6, 2019

Related U.S. Application Data

(60) Provisional application No. 62/904,026, filed on Sep. 23, 2019.

(51) Int. Cl.
*H02M 3/335* (2006.01)
*H02M 7/217* (2006.01)
*H02M 1/42* (2007.01)
*H01R 24/60* (2011.01)

(52) U.S. Cl.
CPC ............ *H02M 7/217* (2013.01); *H01R 24/60* (2013.01); *H02M 1/4208* (2013.01); *H02M 2001/4283* (2013.01)

(58) Field of Classification Search
CPC ............. H02M 3/335; H02M 3/33538; H02M 3/33553; H02M 3/33569; H02M 3/33576; H02M 3/33592
See application file for complete search history.

(56) References Cited

U.S. PATENT DOCUMENTS

| 6,381,152 | B1 * | 4/2002 | Takahashi ............ H02H 7/1206 363/21.06 |
| 8,520,414 | B2 | 8/2013 | Garrity et al. |
| 9,118,255 | B2 * | 8/2015 | Lin .................. H02M 3/33592 |
| 9,407,154 | B2 | 8/2016 | Freeman et al. |
| 9,641,061 | B2 | 5/2017 | Kawamura et al. |

(Continued)

FOREIGN PATENT DOCUMENTS

EP            2887521 A1      6/2015

OTHER PUBLICATIONS

"InnoSwitch-CE Family Off-Line CV/CC Flyback Switcher IC with Integrated 650 V MOSFET, Sync-Rect and Feedback with High Output Current (>2 A) Capability," Power Integrations, Sep. 2017, pp. 1-28; 28 pages.

(Continued)

*Primary Examiner* — Thienvu V Tran
*Assistant Examiner* — Sisay G Tiku

(57) ABSTRACT

A secondary-side controller for an AC-DC converter that has a single synchronous rectifier sensing (SR_SNS) terminal, coupled to a synchronous rectifier (SR) of the AC-DC converter, and a voltage divider circuit coupled to the single SR_SNS terminal configured to provide signals to a sensing circuit. The voltage divider includes an active diode, an internal resistive element, and a switch, in which the active diode is configured to control the switch to enable or disable the internal resistive element based on a comparison result of a voltage at the single SR_SNS terminal and a reference voltage.

19 Claims, 15 Drawing Sheets

(56) References Cited

U.S. PATENT DOCUMENTS

| | | | |
|---|---|---|---|
| 9,893,626 B2* | 2/2018 | Wang | H02M 3/33507 |
| 10,063,131 B2 | 8/2018 | Yang et al. | |
| 10,128,763 B2 | 11/2018 | Balakrishnan et al. | |
| 10,250,151 B1 | 4/2019 | Wu | |
| 10,554,140 B1* | 2/2020 | Khamesra | H02M 3/33592 |
| 10,651,753 B1* | 5/2020 | Khamesra | H02M 7/06 |
| 10,651,754 B1* | 5/2020 | Murugesan | H02M 3/33523 |
| 10,693,384 B1* | 6/2020 | Mondal | H02M 3/33592 |
| 2005/0024897 A1 | 2/2005 | Yang et al. | |
| 2010/0110732 A1* | 5/2010 | Moyer | H02M 3/33592 363/19 |
| 2011/0096578 A1* | 4/2011 | Fang | H02M 3/33592 363/127 |
| 2012/0063175 A1 | 3/2012 | Wang et al. | |
| 2014/0003097 A1* | 1/2014 | Sakurai | H02M 3/33507 363/21.14 |
| 2015/0124495 A1* | 5/2015 | Kong | H02M 3/33592 363/21.14 |
| 2015/0280573 A1* | 10/2015 | Gong | H02M 3/33523 363/21.14 |
| 2016/0261200 A1* | 9/2016 | Yabuzaki | H02M 1/32 |
| 2017/0288440 A1 | 10/2017 | Ye et al. | |
| 2018/0006569 A1* | 1/2018 | Kikuchi | H02M 3/33592 |
| 2018/0175732 A1 | 6/2018 | Dai et al. | |
| 2019/0020282 A1* | 1/2019 | Li | H02M 3/33592 |
| 2019/0097521 A1* | 3/2019 | Tao | H02M 7/217 |
| 2019/0097540 A1* | 3/2019 | Gherdovich | H02M 3/33592 |
| 2019/0229624 A1 | 7/2019 | Liu et al. | |
| 2019/0229635 A1* | 7/2019 | Hyugaji | H02M 1/08 |
| 2020/0044574 A1* | 2/2020 | Miletic | H02M 3/33515 |

OTHER PUBLICATIONS

"NCP4306: Secondary Side synchronous Rectification Driver for High Efficiency SMPS Topologies," ON Semiconductor, Feb. 2011, pp. 1-56; 56 pages.

"UCC24630 Synchronous Rectifier Controller With Ultra-Low-Standby Current," Texas Instruments, Mar. 2015, pp. 1-41; 41 pages.

Corrected International Search Report for International Application No. PCT/US2020/050913 dated Oct. 15, 2020; 2 pages.

Corrected Written Opinion of the International Searching Authority for International Application No. PCT/US2020/050913 dated Oct. 15, 2020; 9 pages.

International Search Report for International Application No. PCT/US2020/050913 dated Oct. 5, 2020; 2 pages.

Written Opinion of the International Searching Authority for International Application No. PCT/US2020/050913 dated Oct. 5, 2020; 5 pages.

* cited by examiner

POWER SAVING TECHNIQUE IN DETACH CONDITION FOR USB-POWER DELIVERY WITH INTEGRATED SYNCHRONOUS RECTIFIER CONTROLLER

PRIORITY

The present application claims the priority and benefit under 35 U.S.C. § 119(e) of U.S. Provisional Application No. 62/904,026, filed on Sep. 23, 2019, which is incorporated by reference herein in its entirety.

TECHNICAL FIELD

This disclosure relates generally to AC-DC power converters, and more particularly to secondary-side controlled converters including synchronous rectifier sense architecture and methods of operating the same.

BACKGROUND

AC-DC converters convert power from an alternating current (AC) source to a direct current (DC) at a specified voltage level. AC-DC converters using secondary-side control can deliver power more efficiently for a given size and are therefore widely used in portable electronic devices. Generally, an AC-DC converter transfers power from an AC input connected or coupled to a primary side of a transformer to a DC output coupled to a secondary side of the transformer.

A simplified schematic block diagram of one such AC-DC converter including a synchronous rectifier (SR) sense architecture is shown in FIG. 1. Referring to FIG. 1 the AC-DC converter 100, generally includes a transformer 102, an active rectification element or power switch (PS), such as a PS field effect transistor (PS_FET 104) on a primary side of the transformer, a synchronous rectifier (SR), such as a SR field effect transistor (SR_FET 106) on a secondary side of the transformer, and an output filter or capacitor 108. In operation the PS_FET 104 switches power to the primary side on or off in response to a signal from a primary side controller 110. In secondary side controlled converters a secondary-side controller 112 coupled to a drain node (SR_DRAIN 114) and gate of the SR_FET 106 senses voltage on the SR_DRAIN and turns the SR_FET on and off in response to sensed voltage peaks, and negative and zero-crossings.

In a flyback converter, the primary side controller 110 receives a signal from the SR_FET 106 or secondary-side controller 112 over a feedback or flyback path 116. During the time in which the PS_FET 104 is on or closed with SR_FET 106 being off or open, the AC-DC converter 100 is said to be operating in fly-back mode, and a magnetic field builds up in the transformer 102 while a current on the primary side increases linearly. When the PS_FET 104 is off or opened, and SR_FET 106 is on or closed, the AC-DC converter 100 transfers the power to secondary-side, in which the magnetic field begins to collapse and the secondary side current decreases steadily, but gradually as power is given to the Cout 108 connected to the output until a point is reached at which there is substantially zero current flow in the secondary side.

One problem with previous generations of AC-DC converters using SR-sense architecture is that depending on the turn-ratio (N:1) of the transformer 102 (typically 4:1), a voltage on the drain node 114 of the SR_FET 106 can go beyond the 1/Nth of rectified AC input voltage, often as high as 115V for 230V AC input. This in turn requires the use of a relatively large and expensive high-voltage FETs on the SR_DRAIN node 114 as well as additional electrostatic discharge (ESD) circuitry in the secondary-side controller 112 to safely couple this voltage from the drain node 114 to the secondary-side controller.

Prior approaches to at least partially addressing the above problem rely on use of a large, high power FET made with greater than 150V tolerant technology to sense the SR_DRAIN node 114 inside Secondary Controller 112 or use of external clamping circuits 118 to clip the input to the secondary-side controller 112. These approaches have not been wholly satisfactory as the secondary-side controller 112 is often realized as an integrated circuit (IC), and the use an external clamping circuit 118 to clip the input to the IC requires additional package pins and external components and connections for peak-detecting and feed-forward (feed-fwd) sensing because externally clipping the voltage on the SR_DRAIN node 114 interferes with these detections. Thus, use of external clamping circuits 118 increases both the size and complexity of the IC and the number of package-pins of the IC dedicated to SR sensing. This in turn increases the bill of materials (BOM) needed for manufacturing the AC-DC converter 100 and the size of the IC on which the secondary-side controller 112 is fabricated, both of which tend to increase cost while decreasing yield and utility of the AC-DC converter 100 in applications requiring compact power converters.

Another problem with previous generations of AC-DC converters 100, and secondary-side controlled flyback converters in particular, arises due to the requirement of detection of a valley or minimum voltage on the primary side. In AC-DC converters 100 the PS_FET 104 should be turned on at the valley to minimize switching loss and thereby achieve optimal efficiency. However, in secondary side controlled flyback converters 100, such as shown in FIG. 1, because the valley on the primary is detected as a peak on the secondary side, which corresponds to a peak on the secondary, detection of the peak needs to be done accurately. This additional requirement of peak detection results in additional required components on the SR_DRAIN node 114, as the external clamping circuit 118 will not allow peaks on SR_DRAIN to be sensed accurately. Hence, additional components are required on SR_DRAIN 114, for example capacitor function Cpd is added in AC-DC converter 100, shown in FIG. 1. Thus, use of external peak-detect component (Cpd) increases both the size and complexity of the IC and the number of package-pins of the IC dedicated to SR sensing. This in turn increases the bill of materials (BOM) needed for manufacturing the AC-DC converter 100 and the size of the IC on which the secondary-side controller 112 is fabricated, both of which tend to increase cost while decreasing yield and utility of the AC-DC converter 100 in applications requiring compact power converters. Consequently, with previous generations of flyback converters 100, it is not possible to hit the valley accurately resulting in loss of efficiency.

Accordingly, there is a need for an AC-DC converter with secondary side control and SR-sense architecture and methods for operating the same that reduces cost and complexity without negatively affecting performance. There is a further need for a flyback converter with secondary-side control and SR-sense architecture and methods for operating the same that provides accurate valley detection for improved efficiency.

BRIEF DESCRIPTION OF THE DRAWINGS

Embodiments of the invention will now be described, by way of example only, with reference to the accompanying schematic drawings in which corresponding reference symbols indicate corresponding parts. Further, the accompanying drawings, which are incorporated herein and form part of the specification, illustrate embodiments of the present invention, and, together with the description, further serve to explain the principles of the invention and to enable a person skilled in the relevant art(s) to make and use the invention.

DETAILED DESCRIPTION

Figure 1:
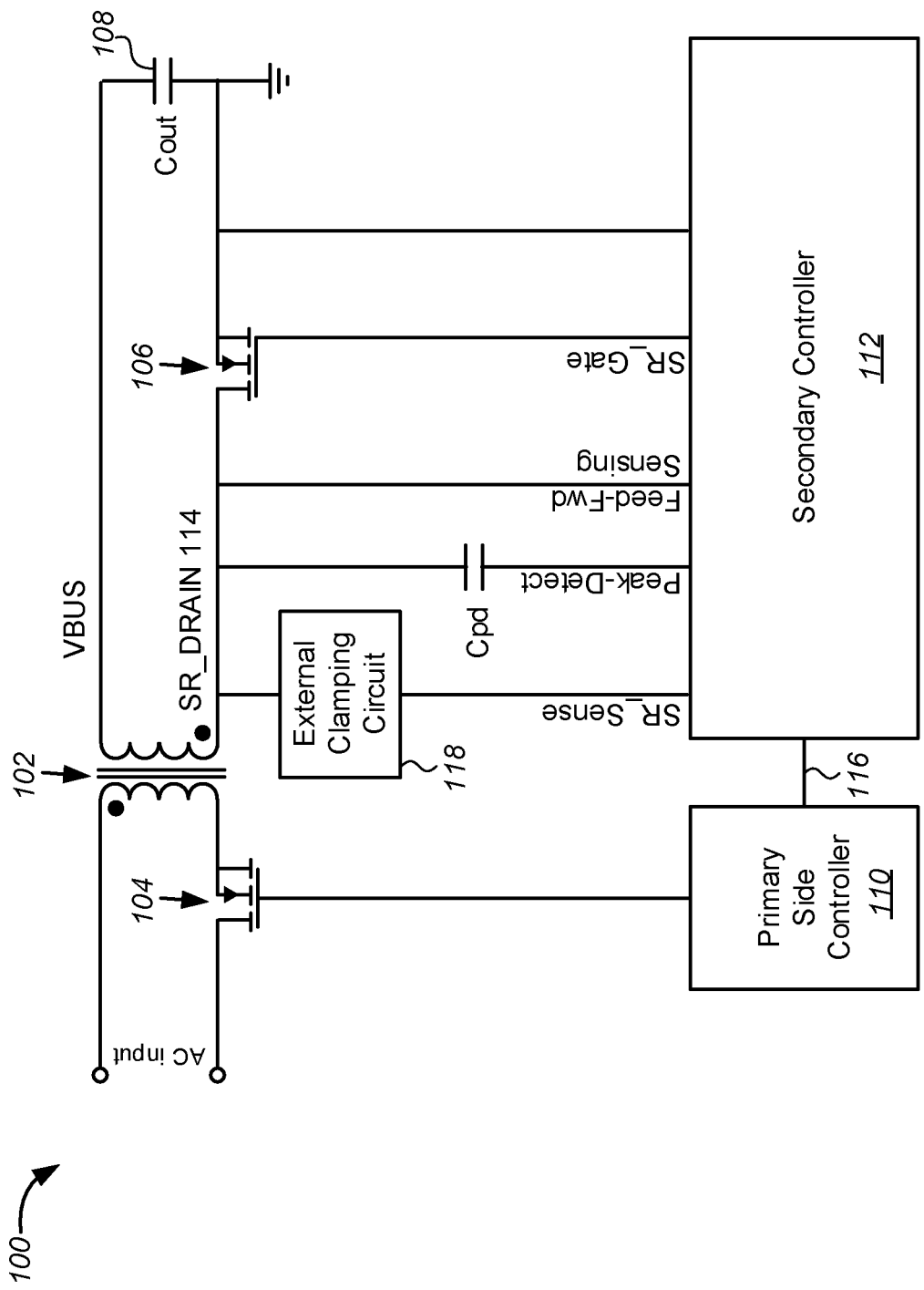
FIG. 1 is a schematic block diagram illustrating a AC-DC converter for which a secondary-side controller and synchronous rectifier (SR) architecture of the present disclosure is particularly useful.

AC-DC converters with secondary side control and synchronous rectifier (SR) architecture including a single SR-sense (SR_SNS) pin or terminal and methods of operating the same are disclosed for reducing the cost, complexity and size of the converter while improving efficiency. The system and methods of the present disclosure are particularly useful in or with AC-DC flyback converters to improve valley detection for improved control of a primary side power switch or primary FET by a secondary-side controller to improve efficiency of the converter.

Summary of Embodiments

The examples, implementations, and embodiments described herein include voltage divider with an active diode to secondary-side controlled AC-DC convertors, systems, and methods of operation thereof to provide undivided sensing signals for improved sensing efficiency and power loss reduction during detach condition.

According to one embodiment, a secondary-side controller for an AC-DC converter of the subject matter may have a single synchronous rectifier sensing (SR_SNS) terminal, coupling to a synchronous rectifier (SR) of the AC-DC converter, having a maximum input voltage significantly less than an SR drain voltage. The secondary-side controller may also have a voltage divider circuit coupled to the single SR_SNS terminal that is configured to provide signals to a sensing circuit. In one embodiment, the voltage divider may include an active diode, an internal resistive element, and a switch. In this embodiment the active diode is configured to control the switch to enable or disable the internal resistive element based on a comparison result of a voltage at the single SR_SNS terminal and a reference voltage.

In one embodiment, the active diode of the aforementioned secondary-side controller may be further configured to disable the internal resistive element when the AC-DC converter is in detach condition and the AC-DC converter is not electrically coupled to any load through a USB Type-C connector.

In one embodiment, the active diode may have a comparator and a NOR logic function, in which an inverted output signal of the comparator and a detach signal are coupled to two inputs of the NOR logic function, and output signals of the NOR logic function are configured to control operation of the switch.

In one embodiment, the active diode may have a comparator that is configured to provide an enabling signal to the switch when the voltage at the single SR_SNS terminal is greater than Vref and to provide a disabling signal to the switch when the voltage at the single SR_SNS terminal is less than Vref.

In one embodiment, the sensing circuit may have a zero-crossing detector (ZCD) block, a negative-sensing (NSN) block, a peak-detector (PKD) block, and a line-feed-forward (LFF) block integrally formed thereon. The ZCD, PKD, NSN, and LFF blocks may be coupled to a drain of the SR through the single SR_SNS terminal.

In one embodiment, the voltage divider circuit may not include any passive diode including a P-N junction diode.

In one embodiment, the voltage divider circuit may also have an external resistance element coupling between the single SR_SNS terminal to the drain of the SR, in which the external resistance element may be disposed outside the secondary-side controller.

In one embodiment, the external resistive element may have a resistance value based on an AC input voltage to a primary side of a transformer of the AC-DC converter and a turn-ratio of the transformer and a maximum input voltage to the single SR_SNS terminal of less than 20V.

In one embodiment, the internal resistive element may be coupled in series to ground through the switch, in which the switch that may be controlled by the active diode, which may be configured to disable voltage division during negative-sensing and zero-crossing detection in the secondary-side controller.

In one embodiment, the secondary-side controller for an AC-DC converter may also have a passive diode disposed between the SR_SNS terminal and a $V_{BUS\_IN}$ terminal, in which the passive diode may be configured to limit the voltage at SR_SNS terminal during power-up of the AC-DC converter. In embodiments, the reference voltage may be pre-determined or programmable.

In one embodiment, the PKD block may include a PKD comparator coupled to the SR_SNS terminal through an internal capacitor to detect a peak voltage on the SR_SNS terminal without any clipping of the peak voltage, and may be configured to generate a PKD_OUT signal which is processed and sent to a primary side controller to turn on a power switch (PS) coupled between an AC input and the primary side of the transformer to enable a valley switching mode of operation. The sensing circuit may also have the ZCD block having a ZCD comparator coupled between the SR_SNS terminal and a negative terminal of a DC output of the AC-DC converter, the comparator may be configured to generate a zero current signal to turn off the SR when zero voltage is sensed on the SR_SNS terminal crossing without any voltage division. In one embodiment, the sensing circuit may further have the NSN block having an NSN comparator coupled to the SR_SNS terminal to detect a negative voltage crossing without any voltage division, in which the NSN comparator is configured to generate a signal for turning on the SR. In one embodiment, the sensing circuit may also have the LFF block having a voltage-to-current (V2I) block coupled to the SR_SNS terminal to detect a proportional AC line in voltage with a voltage division, and this line in voltage information is used to alter that parameters of the AC-DC converter to improve efficiency and performance.

According to one embodiment, a method of operating a secondary-side controlled AC-DC converter may include the steps of sensing a voltage on a drain of a synchronous rectifier (SR) coupled to a secondary side of a transformer with a secondary-side controller comprising an integrated circuit (IC) including a single synchronous rectifier sensing (SR_SNS) terminal through which the IC is coupled to the drain of the SR, sensing the voltage on the drain of SR through the single SR_SNS terminal, coupling the single SR_SNS terminal to ground through a voltage divider circuit including an active diode, an internal resistive element, and a switch, disabling the internal resistive element, using the active diode and the switch, when a voltage at the SR_SNS terminal is determined to be less than a reference voltage, and disabling the internal resistive element, using the active diode and the switch, when the AC-DC converter is in detach condition.

In one embodiment, the aforementioned method may also have the step of enabling the internal resistive element, using the active diode and the switch, when the voltage at the SR_SNS terminal is determined to be greater than the reference voltage and the AC-DC converter is in attach condition.

In one embodiment, the step of disabling the internal resistive element may include sensing an undivided voltage during negative-sensing and zero-crossing detector sensing operation without attenuation.

In one embodiment, the step of enabling the internal resistive element may include sensing a divided voltage at the SR_SNS terminal during line-feed-forward sensing operation.

In embodiments, the reference voltage for voltage comparison may be pre-determined or programmable.

According to one embodiment, a USB system of the subject matter may include a transformer that has a primary side coupled to receive a rectified AC input, and a secondary side coupled to a DC output through a USB connector, and a synchronous rectifier (SR) coupled between the DC output and the secondary side. In one embodiment, the aforementioned USB system may also have a secondary-side controller that may have an integrated circuit (IC), and a plurality of terminals through which the IC is coupled to the secondary side of the transformer, the plurality of terminals including a single synchronous rectifier sensing (SR_SNS) terminal through which the IC is coupled to a drain of the SR to sense voltage on the drain of the SR. In one embodiment, the single SR_SNS terminal may be coupled to the drain of the SR and a sensing circuit through a voltage divider circuit, in which the voltage divider circuit may have an active diode, an internal resistive element, and a switch. In one embodiment, the active diode may be configured to control the switch to enable or disable the internal resistive element based on a comparison result of a voltage at the single SR_SNS terminal and a reference voltage.

In one embodiment, the active diode may be further configured to disable the internal resistive element when the AC-DC converter is in detach condition, in which the AC-DC converter is not electrically coupled to any load through a USB type-C connector.

In one embodiment, the voltage divider circuit may further have an external resistance element coupling the single SR_SNS terminal to the drain of the SR.

In one embodiment, the sensing circuitry may have a zero-crossing detector (ZCD) block, a negative-sensing (NSN) block, a peak-detector (PKD) block, and a Line-Feed-forward (LFF) block integrally formed on the IC.

Further features and advantages of embodiments of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to a person skilled in the relevant art(s) based on the teachings contained herein.

Figure 2A:
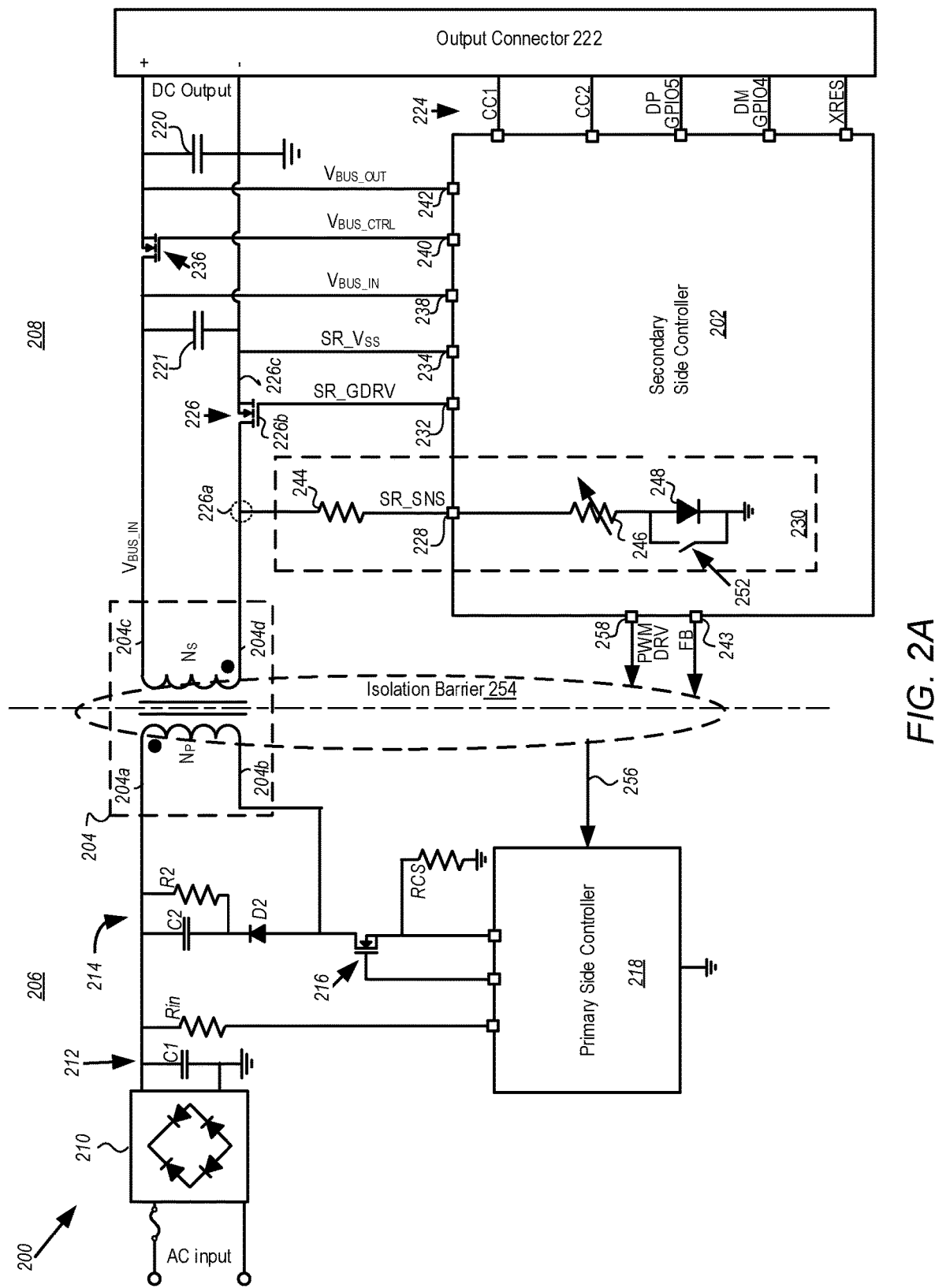
FIG. 2A is a schematic block diagram depicting an embodiment of an AC-DC converter including a secondary-side controller and SR architecture in accordance with the present disclosure.

An embodiment of an AC-DC converter including a secondary-side controller and SR architecture in accordance with the present disclosure will now be described with reference to FIGS. 2A through 2E. FIG. 2A is a schematic block diagram of an AC-DC converter 200 including an embodiment of a secondary-side controller 202 and having an SR architecture in accordance with the present disclosure. Referring to FIG. 2A, the AC-DC converter 200 generally includes a transformer 204 having a primary winding (NP) on a primary side 206 electrically connected or coupled to an AC input, and a secondary winding (NS) on a secondary side 208 coupled to a DC output.

On the primary side 206, a rectifying circuit, such as a bridge rectifier 210, and one or more input filters 212, 214, coupled to a first terminal 204a of the transformer 204 rectifies an AC input voltage and supply input power to the primary winding of the transformer 204. The input filters can include a first input filter 212 having a capacitor (C1) coupled to or across an output of the rectifier 210, and a second, RC filter 214 including a resistor or resistive element (R2) and a capacitor (C2) coupled in parallel between the first terminal 204a of the transformer 204 and a cathode of a diode or rectifier (D2) having an anode coupled to a second terminal 204b of the transformer. Generally, as in the embodiment shown, the AC-DC converter 200 further includes a power switch (PS 216), such as a primary field effect transistor (PR_FET), having a first or drain node coupled to the second terminal 204b of the transformer 204, a second or gate node coupled to a primary side controller 218, and a third or source node coupled to the primary side controller and, through a current sensing element, such as a resistive element (RCS) to ground to sense a primary side current (I_primary) flowing through the primary winding when the PS 216 is closed or conducting. Generally, as in the embodiment shown, the primary side controller 218 is further coupled to the first terminal 204a of the transformer 204 through a resistive element (Rin) to receive a voltage or signal equal or proportional to the rectified AC input voltage.

On the secondary side 208 the AC-DC converter 200 includes a filter capacitor 221 coupled between a third terminal 204c of the transformer 204 and an electrical ground or ground terminal, and an output capacitor 220 coupled between a third terminal 204c of the transformer 204 and an electrical ground to provide a DC output voltage to an output interface or connector 222. Generally, as in the embodiment shown the output connector 222 is further coupled to the secondary-side controller 202 through a number of communication channels 224 to support various charging protocols. Suitable output connectors 222 can include those compatible with and supporting standard and proprietary charging protocols including Universal Serial Bus Power Delivery USB PD2.0 and USB PD3 with Programmable Power Supply (PPS), Qualcomm® Quick Charge, Samsung® AFC, and Apple® charging protocols. For example, the connector can include a Universal Serial Bus type C (USB-C) compatible connector where the AC-DC converter 200 is compliant with the USB protocol to provide a DC output voltage of about 3.3 VDC to about 21.5 VDC at a current of from about 0 to about 3000 milliamps (mA).

In accordance with the present disclosure, the AC-DC converter 200 further includes, on the secondary side 208, a synchronous rectifier (SR 226), such as a synchronous rectifier field effect transistor (SR_FET), coupled between a fourth terminal 204d of the transformer 204 and the ground terminal of the DC output. The SR 226 includes a first or drain node 226a coupled to the fourth terminal 204d of the transformer 204 and the secondary-side controller 202 to sense a voltage on the drain of the SR; a second or gate node 226b coupled to the secondary-side controller to drive or control the SR; and a third or source node 226c coupled to the secondary-side controller and the ground terminal of the DC output.

In certain embodiments, such as that shown, the secondary-side controller 202 is realized or implemented as single integrated circuit (IC), or as a number of ICs packaged in a single IC package, and the drain node 226a is coupled to a single SR_SNS pin or terminal 228 of the IC through a voltage divider 230 including circuit elements both internal and external to the IC of the secondary-side controller. The gate node 226b of the SR 226 is coupled to the secondary-side controller 202 through a SR-Gdrive (SR_GDRV) pin or terminal 232, and the source node 226c of the SR 226 is coupled to the secondary-side controller through a SR_Vss (ground voltage level) pin or terminal 234.

Optionally, as in the embodiment shown, the secondary side further includes an additional or secondary switch (SS) 236, such as a NFET, coupled between the third terminal 204c of the transformer 204 and a positive DC output to enable to the secondary-side controller 202 to turn off the DC output to protect against over voltage and/or under voltage conditions. The SS 236 includes a drain node coupled to a voltage bus in pin or terminal ($V_{BUS\_IN}$) 238 of the secondary-side controller 202; a gate node coupled to a voltage bus control pin or terminal ($V_{BUS\_CTRL}$) 240 to drive or control the SS; and a source node coupled to a voltage bus out pin or terminal ($V_{BUS\_OUT}$) 242 and to the positive terminal of the DC output.

The voltage divider 230 includes an external resistive element 244, an internal resistive element 246 and an internal rectifier 248. Although shown schematically as a diode, it will be understood that this need not be case in every embodiment, and that internal rectifier 248 may be a PN diode (as shown), or alternatively, a synchronous diode or a FET configured or connected to function as a diode. The configuration or placement of the internal rectifier 248, i.e., connected with a cathode to ground, ensures that during negative sensing or zero-crossing operations there is substantially no current flow through the voltage divider 230, thereby allowing the full, undivided negative voltage on the drain node 226a to be coupled to the SR_SNS pin 228. A resistance value of external resistive element 244 is generally fixed by the manufacturer of the AC-DC converter 200 and is selected based on an expected maximum voltage on the drain node 226a based on the maximum AC voltage input, and turn-ratio of the transformer 204 to limit a maximum voltage on the SR_SEN node 228 to enable the secondary-side controller 202 to be a made with non-high voltage devices, made using standard, low voltage technologies. Suitable values for the resistance of the resistive element 244 are from about 4 KΩ to about 10 KΩ. For example in one embodiment in which the maximum input voltage after bridge rectifier 210 is 380V and the transformer 204 has a 4:1 turn ratio, and the voltage of 21.5V DC on VBUS_IN 238, the SR_DRAIN 226a voltage can be 116.5V. Secondary-side controller 202 is fabricated using 20V tolerant technology, and the external resistive element 244 has a resistance of about 10 KΩ and internal resistance of about 2 KΩ to limit the maximum voltage on the SR_SNS node 228 to no more than about 21.5V.

The internal resistive element 246, shown schematically as a variable resistance in FIG. 2A, can have a resistance value set by the manufacturer at the time the AC-DC converter 200 is manufactured based on either desired input or output voltages, or to compensate for variations in parameters of the IC or other components in the AC-DC converter. Alternatively, the resistance value of the internal resistive element 246 can be dynamically adjusted by a calibration circuit in the AC-DC converter 200 or secondary-side controller 202, either at start-up or powering on of the AC-DC converter, or periodically thereafter.

Optionally, as in the embodiment shown, the voltage divider 230 further includes a bypass switching element or switch 252 in parallel the internal rectifier 248. The switch 252 is closed during feed-forward (ff) sensing in response to an ff-signal (ff_enable) generated in the secondary-side controller 202 upon detection of an increasing or non-zero positive voltage on the drain node 226a, which indicates a feed-forward operation. It is noted that although in the embodiment shown in FIG. 2A the internal rectifier 248 and the switch 252 are shown schematically as two separate and distinct elements, this need not be the case in every embodiment, and the rectifier and switch may alternatively include a single device, such as a FET, in which the switch is formed by the FET and the rectifier is formed by an intrinsic body diode between a source and drain of the FET.

As shown in FIG. 2A, the AC-DC converter 200 further includes an isolation circuit or barrier 254 to electrically isolate the secondary-side 208 from the high AC input voltage present on the primary side 206. Because the transformer 204 is a step down transformer it is generally considered part of the isolation barrier 254. Additionally where, as in the embodiment shown, the AC-DC converter 200 is a flyback converter in which a signal 256 is provided to the primary side controller 218 from pins on the secondary-side controller 202, such as a feedback pin 243 or pulse width modulation (PWM) drive pin 258, the isolation barrier 254 can further include additional circuits or elements between the secondary-side controller and the primary side controller 218 or PS 216. Details of these additional circuits or elements according to various embodiments are described below with reference to FIGS. 2C and 2D.

Figure 2B:
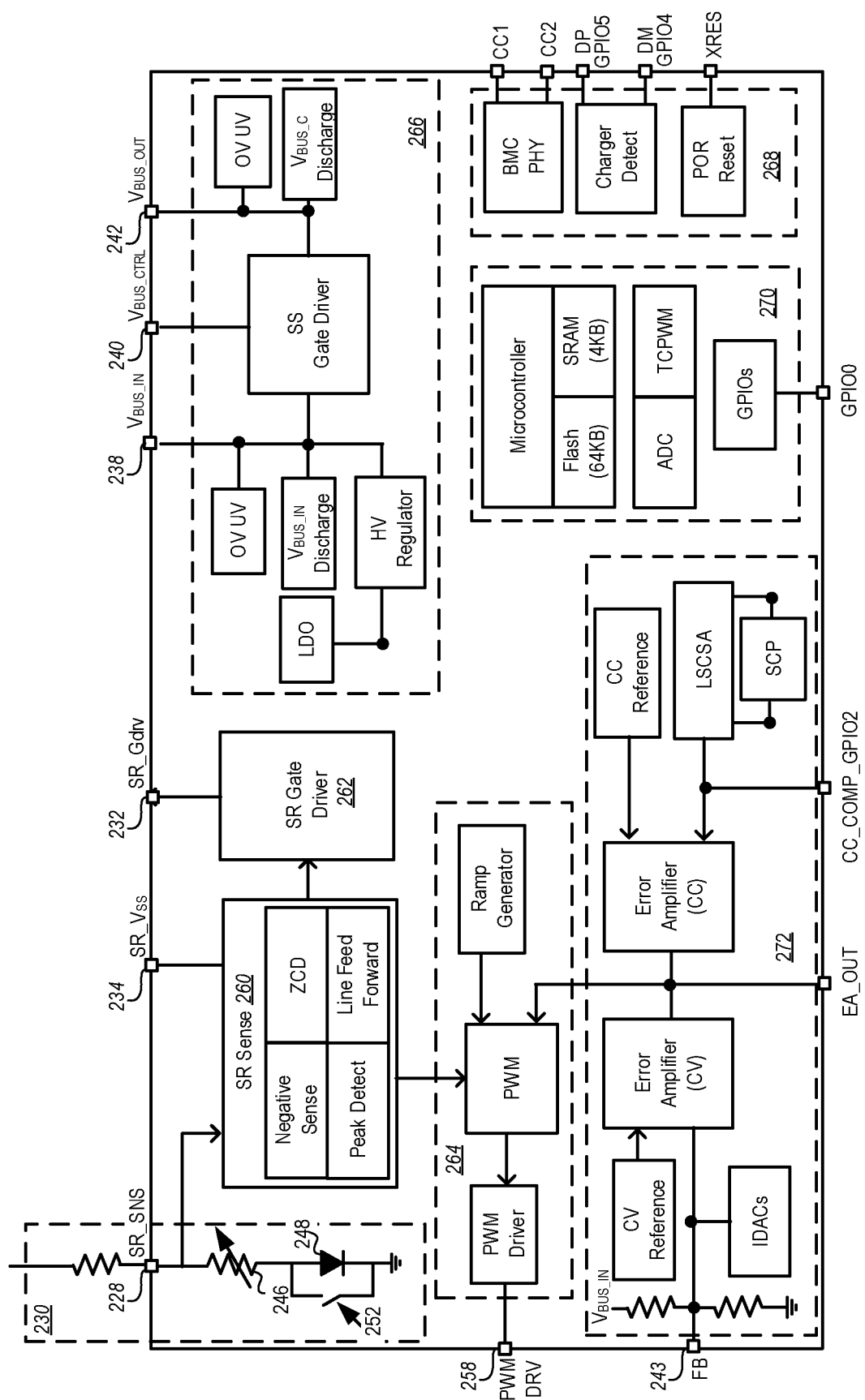
FIG. 2B is a detailed block diagram depicting an embodiment of the secondary-side controller of FIG. 2A in accordance with the present disclosure.

FIG. 2B is a detailed block diagram depicting an embodiment of the secondary-side controller 202 of FIG. 2A. Referring to FIG. 2B, in addition to the voltage divider 230 the secondary-side controller 202 generally further includes an SR sense circuit or block 260 and a SR gate driver circuit or block 262 coupled to the gate node 226b of the SR 226 through the SR-Gdrive pin 232. The SR sense block 260 is coupled to the drain node 226a of the SR 226 through the single SR_SNS pin 228 and the voltage divider 230 and through the SR-Vss pin 234 to the source node 226c of the SR. The SR sense block 260 generally includes a zero-crossing detector (ZCD) block, a negative-sensing (NSN) block, a peak-detector (PKD) block, and a line-feed-forward (LFF) block for sensing a voltage on the drain 226a of the SR 226 to sense or detect a zero-crossing, a negative voltage, a peak (positive) voltage and a feed-forward operation. One or more outputs of the SR sense block 260 are coupled to the SR gate driver block 262 to control the SR 226 and to a pulse width modulation (PWM) circuit 264 to provide a signal 256 through the PWM drive pin 258 to the primary side controller 218 to control the PS 216. The PWM circuit 264 includes a ramp generator and PWM for generating a signal having a modulated pulse width, and a PWM driver for boosting a voltage or power of the signal to that necessary for driving the primary side controller 218 or PS 216.

As shown in FIG. 2B, the secondary-side controller 202 further includes a secondary switch (SS) circuit 266. The SS circuit 266 includes OV-UV circuits or blocks for detection over voltage (OV) and under voltage (UV) conditions on $V_{BUS\_IN}$ 238 and $V_{BUS\_OUT}$ 242; low dropout (LDO) and high voltage (HV) regulators; and discharge circuits or blocks for discharging $V_{BUS\_IN}$ and $V_{BUS\_OUT}$.

An interface circuit 268 switch includes circuits or blocks for communicating with a device being powered or charged by the AC-DC converter 200 to support various charging protocols. These circuits or blocks can include a Biphase Mark Code (BMC) physical layer (PHY) to communicate with device using certain charging protocols, a charger detect block and a power on reset (POR) block to reset the device, putting it into a known state on initiation of charging by the AC-DC converter 200.

The secondary-side controller 202 further includes a microcontroller unit (MCU) subsystem 270 including logic a microprocessor or controller for executing programs stored memory in the MCU subsystem; analog-to-digital converters (ADC); a multipurpose Timer Counter Pulse Width Modulator (TCPWM) capable of performing a multiple functions necessary for operation of the MCU; and a number of general purpose input/outputs (GPIOs), only one of which is shown.

Lastly, the secondary-side controller 202 further includes a feedback circuit or circuit 272 coupled to the feedback pin 243 to provide error correction to the PWM circuit 264, and, in certain embodiments of the isolation barrier 254 to provide a feedback signal to the primary side controller 218. Generally, as in the embodiment shown circuit 272 includes a constant voltage (CV) reference, a constant current (CC) reference, one or more error amplifiers and inter-digital analog converters (IDACs), a low-side current sense amplifier (LSCSA), and a short circuit protection (SCP) block.

Embodiments of the isolation barrier 254 of the AC-DC converter 200 of FIG. 2A will now be described with reference to FIGS. 2C and 2D. It is noted that FIGS. 2C and 2D each illustrate one exemplary embodiments of the isolation barrier 254, and that other embodiments of the isolation barrier can be implemented that may or may not include all elements and components shown in these figures. Thus, the embodiments of FIGS. 2C and 2D are not intended to limit the present invention and the appended claims in any way.

Figure 2C:
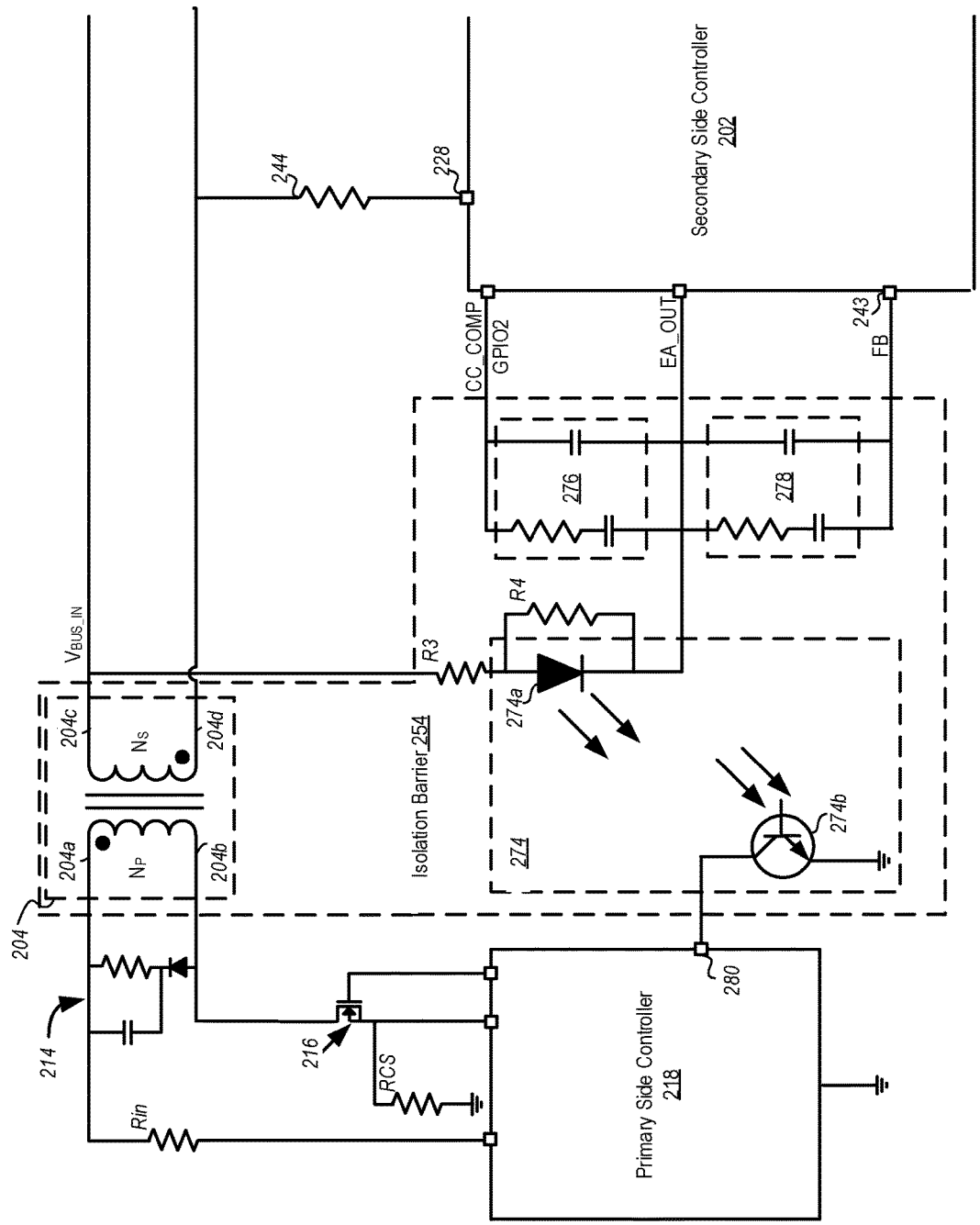
FIG. 2C is a schematic block diagram depicting an embodiment of the isolation barrier of FIG. 2A including an opto-isolator in accordance with the present disclosure.

Referring to FIG. 2C, in a first embodiment the isolation barrier 254 includes an opto-isolator 274 to provide electrical isolation between the feedback pin 243 of the secondary-side controller 200 and the primary side controller 218. Generally, the opto-isolator includes a light emitting element, such as a light emitting diode (LED) 274a and a light sensitive element, such as a light sensitive or phototransistor 274b. The LED 274a has a cathode coupled directly to an error amplifier output pin (EA_OUT), and an anode coupled to the third terminal 204c of the transformer 204 through a voltage divider including a first resistive element (R3) and a second resistive element (R4). The cathode of the LED 274a is further coupled to the FB pin 243 and to a constant current compensation general purpose input/output (CC_COMP_GPIO), through resistor-capacitor filters or networks 276 and 278. The phototransistor 274b can include a bipolar NPN transistor, and is coupled to the primary side controller 218 through an FB_input pin 280. In this embodiment, the secondary-side controller 202 uses outputs from the error amplifier 272 to take the feedback from the secondary side and pass it on to the primary controller over the opto-isolator 274. This architecture provides three key features: secondary-side sensing and regulation, synchronous rectification, and charging port controller.

Figure 2D:
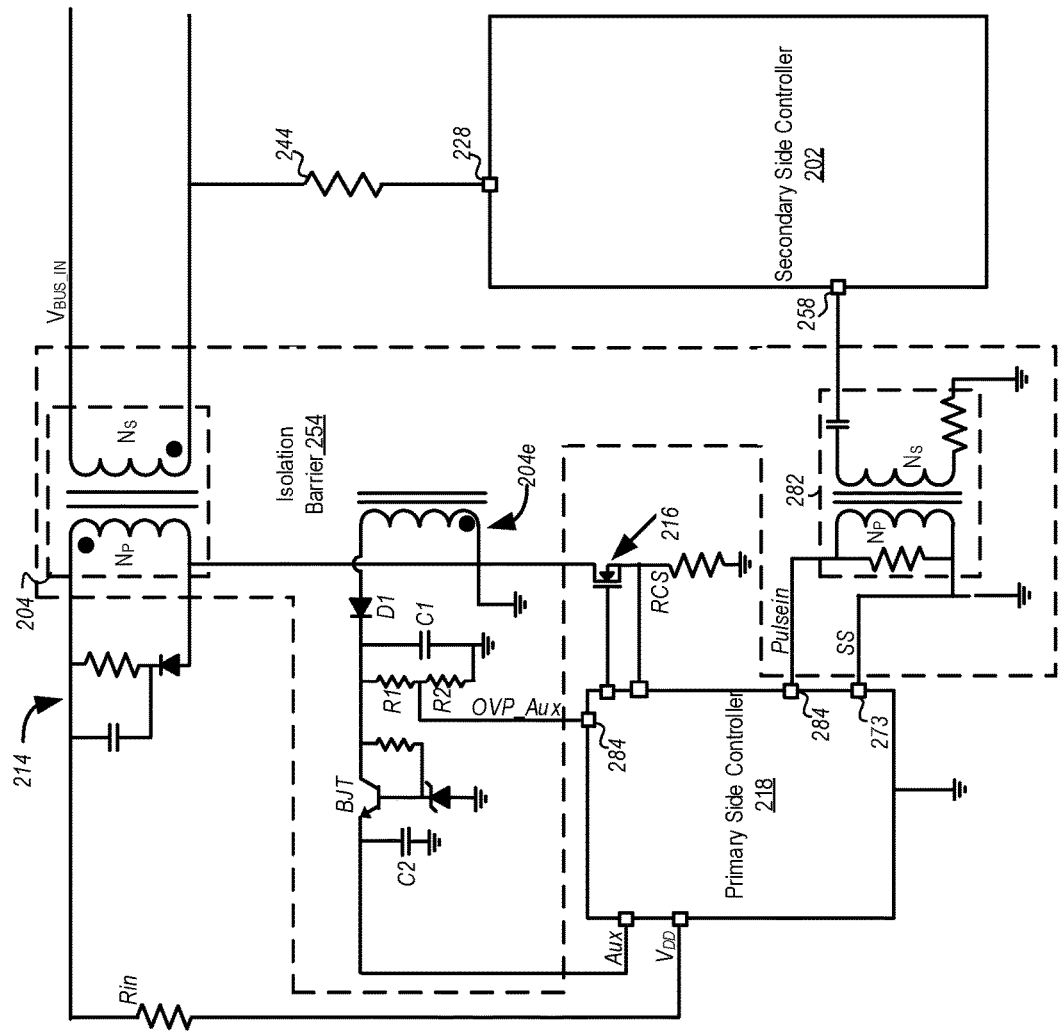
FIG. 2D is a schematic block diagram depicting another embodiment of the isolation barrier of FIG. 2A including a pulse transformer in accordance with the present disclosure.

FIG. 2D is a schematic block diagram depicting another embodiment of the isolation barrier of FIG. 2A including a pulse transformer 282 coupled between the PWM drive pin 258 of the secondary-side controller 202 and a pulse_in pin 284 and a soft-start (SS) pin 273. The PWM drive pin 258 to the primary side controller 218 of the primary side controller 218 modulates the pulse width of the primary MOSFET in voltage mode control. In this architecture the primary side controller 218 engages the error amplifier 272 and the programmable ramp generator of the PWM circuit 264 to determine the pulse width of the PWM signal. This PWM signal is transferred from the secondary-side controller 202 to the primary side controller 218 through the pulse transformer 282. This architecture, like that of FIG. 2C, also provides three key features: secondary-side sensing and regulation, synchronous rectification, and charging port controller. The isolation barrier also includes an auxiliary coil of the transformer 204, which functions as a fly-back step-down transformer 204e to provide power to primary side controller 218 via an Aux pin. The step-down transformer 204e along with a diode D1 followed by capacitor C1 to ground stores the stepped-down-voltage which is then clipped by a bipolar junction transistor (BJT) structure and then coupled to the Aux pin. This additional circuit helps to reduce total power consumption of the AC-DC converter 200 as the primary side controller 218 is supplied through the Aux pin instead of by a separate power supply through another pin coupled to the first terminal 204a on the primary side 206 of the transformer 204 through Rin. A resistor divider R1, R2, connected to an over voltage protection (OVP)_AUX pin 284 of primary side controller 218 is used to sense a reflected voltage of VBUS_IN on the secondary-side 208 via the step-down transformer 204e. With this VBUS_IN signal primary side controller 218 can disable PS 216, shown here as a PR_FET, using internal circuitry of the primary side controller.

Figure 2E:
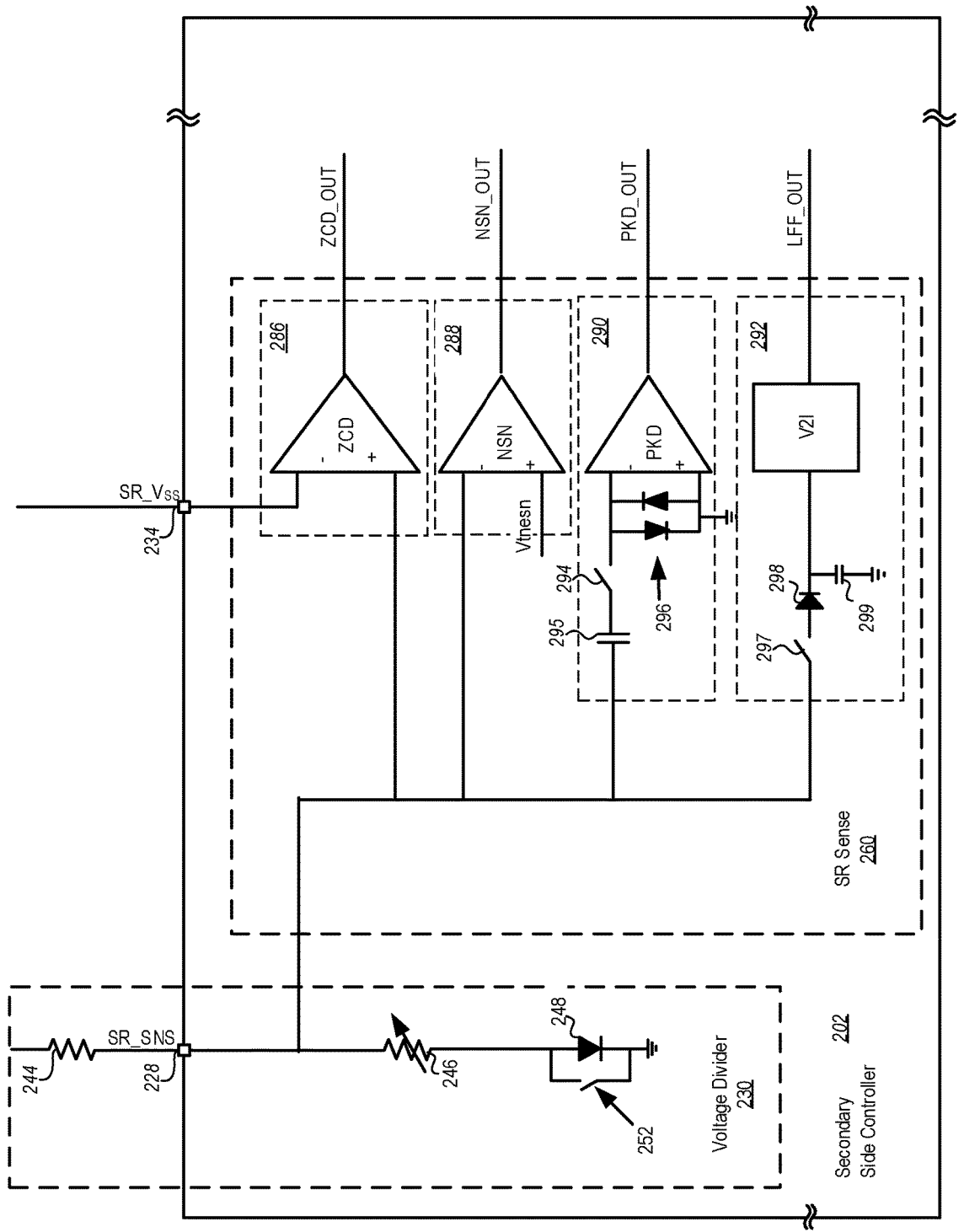
FIG. 2E is a schematic block diagram depicting of a portion of the secondary-side controller of FIG. 2B depicting an embodiment of the SR sense block in accordance with the present disclosure.

FIG. 2E is a schematic block diagram depicting of a portion of the secondary-side controller of FIG. 2B depicting an embodiment of the SR sense block 260 in accordance with the present disclosure. As shown in FIG. 2E, the SR sense block includes a zero-crossing detector (ZCD) block 286, a negative-sensing (NSN) block 288, a peak-detector (PKD) block 290, and Line-feed-forward (LFF) block 292, all integrally formed on a single IC with other components and elements of the secondary-side controller 202.

The ZCD block 286 can include a comparator having a first, inverting input coupled through the SR_Vss pin 234 to the source node 226c of the SR 226, and a second, non-inverting input coupled to the SR_SNS pin 228 and through the voltage divider 230 to the drain node 226a of the SR. During the ZCD detection phase, where the SR_DRAIN 226a is at negative voltages and ramping towards 0V, the rectifier 248 is kept enabled without enabling switch 252 to allow no voltage division in voltage divider 230. This enables direct voltage of SR_DRAIN 226a at the non-inverting input of the ZCD comparator 286. The comparator of the ZCD block 286 can be configured to generate a zero current signal (ZCD_OUT) to turn off the SR 226 when zero voltage is sensed on the SR_SNS pin 228 and SR_DRAIN pin 226a crossing without any voltage division. No voltage division enables precise detection of Zero-current (or voltage crossing of SR_DRAIN 226a which improves efficiency of the AC-DC converter 200.

The NSN block 288 can also include a comparator having a first, inverting input coupled to the SR_SNS pin 228 and through the voltage divider 230 to the drain node 226a of the SR 226, and a second, non-inverting input coupled to a negative reference voltage (Vtnesn) which can be anywhere from −700 mV to +200 mV. This reference voltage Vtnesn can be defined to desired negative or low voltage trip point at which the controller needs to turn-on the SR_GDRV 226b. An alternate method for negative reference voltage could be, for example, connecting non-inverting input coupled through the SR-Vss pin 234 to the source node 226c of the SR 226 and the comparator can have in-build offset to trip when SR_SNS pin 228 is at negative voltage. During the NSN detection phase, where the SR_DRAIN 226a is going from positive to negative voltages, the rectifier 248 is kept enabled without enabling switch 252 to allow no voltage division in voltage divider 230. This enables direct voltage of SR_DRAIN 226a at the inverting input 228 of the NSN comparator 288. The NSN comparator 288 generates a negative voltage signal (NSN_OUT) to turn-on the SR 226.

During power delivery on the secondary side, when the SR 226 turns-off, and as PS 216 has not yet turned-on, it results in LC sinusoidal oscillations on the SR_DRAIN 226a as well as inverted sinusoidal on the PR drain 204b terminal of the fly-back transformer 204. To improve AC-DC converter efficiency, Primary switch 216 must be turned on when there is a valley in these sinusoidal oscillations, which corresponds to a peak on the secondary SR_DRAIN 226a node. The PKD block 290 is the peak sensing block on the secondary side. The PKD block 290 can also include a comparator having a first, inverting input coupled to the SR_SNS pin 228 through a switch 294 and an internal capacitor 295, and from the SR_SNS pin to the drain node 226a of the SR 226 through the voltage divider 230, and a second, non-inverting input coupled to ground. Generally, as in the embodiment shown the PKD block 290 further includes a back-to-back connected diode circuit 296 across the first and second inputs to the comparator to detect the peak of the sinusoidal waveform seen on SR_SEN 228. The comparator is configured to generate a peak voltage detection signal (PKD_OUT), which can be coupled to the primary side controller 218 to turn on the PS 216 to enable a valley switching mode of operation. The switch 294 is kept off during NSN and ZCD detection phase to avoid capacitive load offered by PKD block, on SR_SEN 228 node, which reduces the delay in sensing NSN and ZCD and improves performance and efficiency of the AC-DC converter 200. The switch 294 is turned-on during peak-detection function, by using a derived signal of ZCD_OUT as ZCD_OUT decides turning-off of SR FET 226, after which LC sinusoidal oscillation starts.

Finally, AC Line-Feed-Forward (LFF) block 292 can include a voltage-to-current (V2I) block, which is coupled through a switch 297, a sample and hold arrangement using diode element 298 along with charge-storage element (capacitor 299) to the SR_SNS pin 228 and through the voltage divider 230 to the drain node 226a of the SR 226. During the phase when primary switch 216 is turned on, the difference between node 204d and 204c of fly-back transformer develops a proportional reflected voltage of line-in rectified voltage on node 204a of transformer 204, in accordance to turn-ratio (N) of fly-back transformer 204. As node 204d is also coupled to SR_DRAIN 226a which is used as a sensing node insider secondary-side-controller 202 after a resistor divider 230, the node SR_SEN 228 also carries the line-in voltage information which is derived using the LFF block 292. The line-in information can be used by secondary-side-controller 202 to alter the valley switching or PWM pulse-width to optimize the efficiency of the AC-DC converter 200 across variable AC line-in. The phase where primary switch 216 is turned-on and SR_DRAIN 226a gets reflected proportional voltage, is defined as feed-forward sensing phase and during this phase, switch 297 is turned-on to start sensing line-In voltage via SR_SEN 228 pin. At the same time, switch 252 is also turned on to bypass rectifier element 248 to allow exact resistive divided version of SR_DRAIN 226a to reach at the input of LFF block 292. The switch 297 is kept off during NSN and ZCD detection phases to avoid capacitive load offered by LFF block on SR_SEN 228 node, which helps to reduce the delay in sensing NSN and ZCD and improves performance and efficiency of the AC-DC converter 200. LFF block 292 is configured to generate a current signal (IFF_OUT) when the AC-DC converter 200 is operating in a feed-forward sensing mode. This IFF_OUT current then can be used to modulate PWM pulse-width as per line AC voltage, which improves performance and efficiency of the AC-DC converter over wide-range of AC input voltage range. The IFF_OUT current can also be converted to voltage which would be proportional to line AC input voltage and can be used for any function required on the secondary-side controller, like for altering valley at which primary FET 216 to be turned-on based on line AC voltage for same output power requirement, to improve performance of the AC-DC converter 200.

Figure 4:
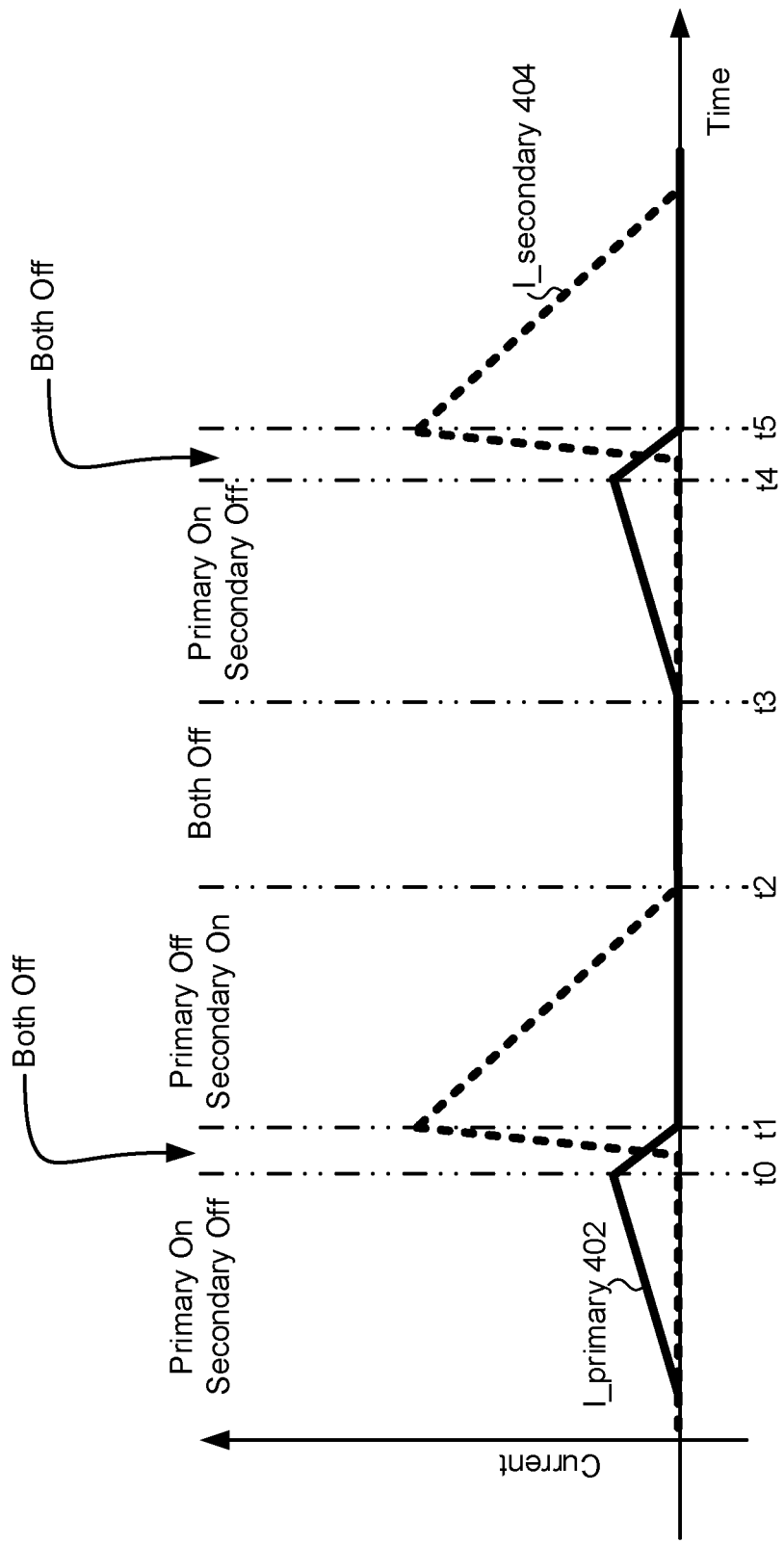
FIG. 4 is a graph showing primary current (I_primary) and secondary current (I_secondary) over time in the circuit of FIG. 2A as operated by the method of FIG. 3.
Figure 5:
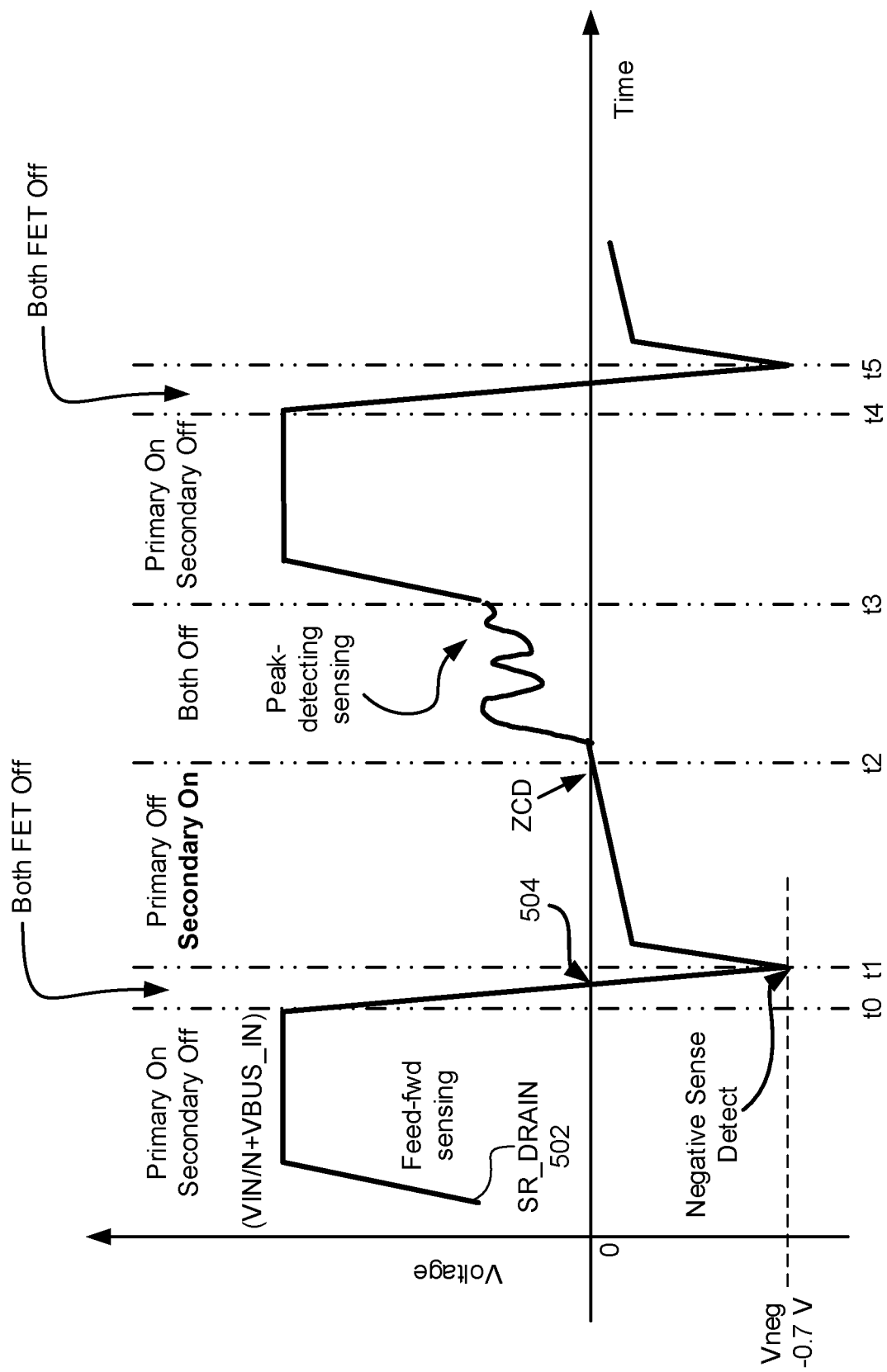
FIG. 5 is a graph showing voltage on a drain node of a SR overtime in the circuit of FIG. 2A when operated by the method of FIG. 3.

A method of operating an AC-DC converter having a secondary-side controller including an IC having a single SR_SNS pin through which the IC is coupled to the drain of a SR through a voltage divider will now be described with reference to the flowchart of FIG. 3, and the graphs of FIGS. 4 and 5. FIG. 4 is a graph showing primary current (I_primary 402) and secondary current (I_secondary 404) in the circuit of FIGS. 2A-E when operated by the method of FIG. 3. FIG. 5 is a graph showing the resulting voltage 502 on the drain node of the SR when operated by the method of FIG. 3.

Figure 3:
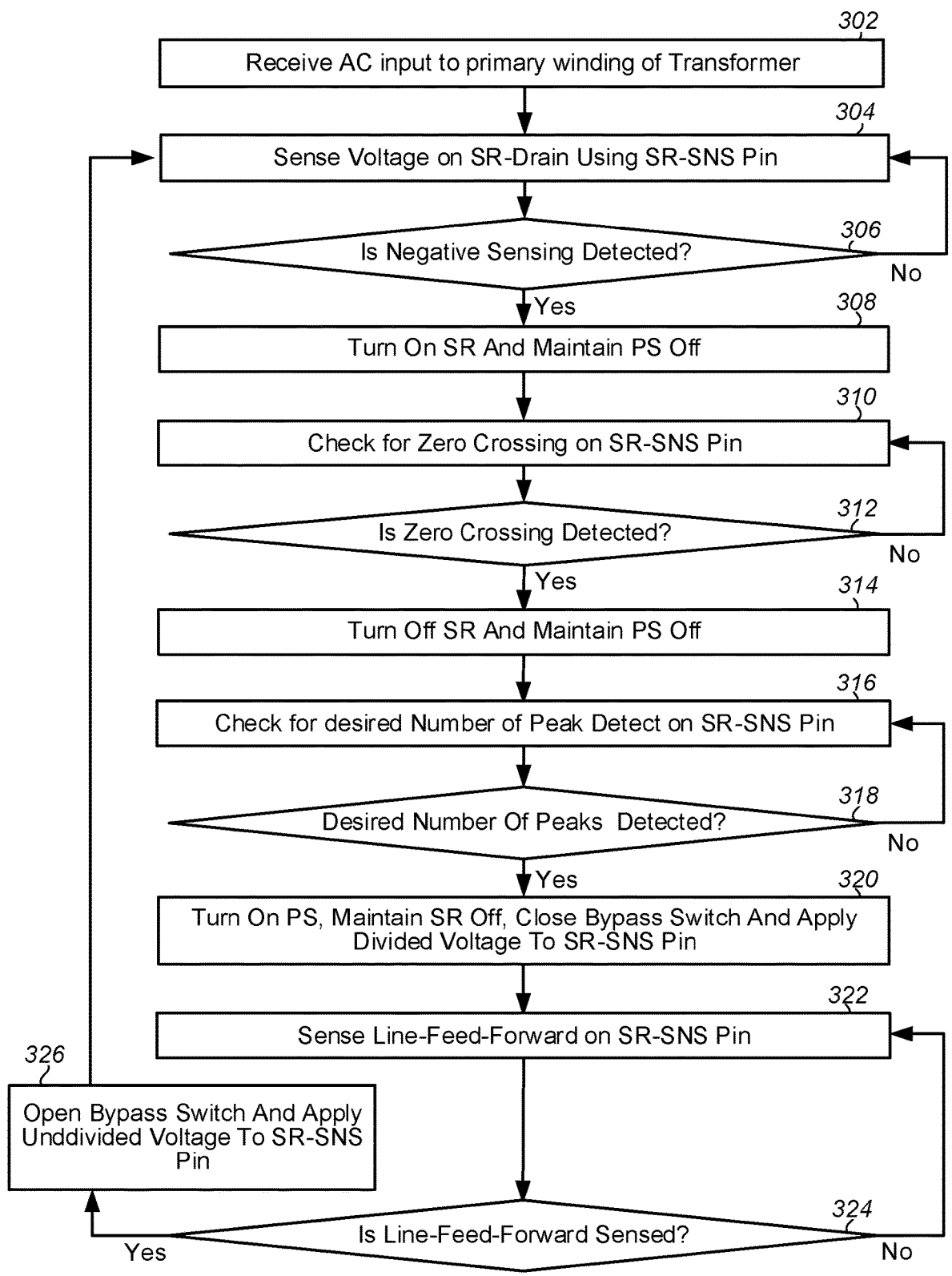
FIG. 3 is a flowchart illustrating an embodiment of a method for operating an AC-DC converter including a secondary-side controller and SR architecture in accordance with the present disclosure.

Referring to FIG. 3 and to FIGS. 2A and 2E the method begins with receiving a rectified AC input to the primary side 206 of the transformer 204 (302). A voltage on the drain 226a of the SR 226 is sensed through the single SR_SNS pin 228 (304). Next, it is determined if negative sensing is detected (306). Generally, determining if the AC-DC converter is operating in a negative sensing mode is accomplished by sensing an increasing negative voltage on the SR_SNS pin 228. If negative sensing is not detected step or block 304 is repeated and the voltage on the drain 226a of the SR 226 continues to be sensed through the single SR_SNS pin 228. If negative sensing is detected, the SR 226 is turned on while the power switch or PS 216 on the primary side is 206 of the transformer 204 is maintained off (308).

Next, a check is performed for a zero crossing on SR_SNS pin 228 using the ZCD block 286 in the secondary-side controller 202 (310), and it is determined if a zero-crossing is detected (312). If a zero crossing is not detected step or block 310 is repeated to continue to check for a zero crossing on the SR_SNS pin 228. If a zero crossing is detected, the SR 226 is turned off and the PS 216 is maintained off (314).

A check is then performed for a predetermined or desired number of peaks of a predetermined or desired peak voltage detected on SR_SNS pin 228 using the PKD block 290 in the secondary-side controller 202 (316), and it is determined if the desired number of peaks is detected (318). If the desired number of peaks is not detected step or block 316 is repeated to continue to check for the desired number of peaks. If the desired number of peaks is detected, the SR 226 is maintained off, the PS 216 is turned on (320), and the bypass switch 252 closed to apply a divided voltage to the SR_SNS pin 228.

Next, a check is performed to sense if the AC-DC converter 200 is operating in a Line-Feed-Forward (LFF) sensing mode (322), and a determination made whether or not LFF is sensed (324). Generally, determining if the AC-DC converter 200 is operating in an LFF sensing mode is accomplished by sensing a rising or steady positive voltage on drain 226a of the SR 226 applied through the single SR_SNS pin 228 using the LFF block 292. If the AC-DC converter 200 is not operating in an LFF sensing mode, step or block 322 is repeated to continue to check for LFF sensing. If it is determined the AD-DC converter is operating in an LFF sensing mode, bypass switch 252 is opened so that the voltage applied to the secondary-side controller 202 through the single SR_SNS pin 228 is undivided by the voltage divider 230 (326), and step or block 304 is repeated to sense voltage on the drain 226a of the SR 226 through the single SR_SNS pin 228.

Referring to the voltage divider 230 featured in FIGS. 2A and 2E, current may flow from drain node 226a of the SR 226 to ground whenever a voltage on the drain node 226a is above 0V or a voltage close to 0V. The continuous power dissipation may happen between drain node 226a of the SR 226 and ground through internal resistive element 246 and internal rectifier or diode 248, even when AC-DC converter 200 is not attached to any device or load (detach condition), possibly through a USB type-C connector. The USB power adapter regulation code of conduct may require that any power adaptor to consume less than 75 mW in detach condition. The power dissipation through the voltage divider 230 to ground during detach condition, in which AC-DC converter 200 is not electrically attached to any device or load, through output connector 222 or otherwise, may raise certain issues, such as power adaptors to continuously take current even when device is not connected, causing the power adaptor to heat up and constant power consumption. In some embodiments, power adaptors may consume up to 700 ρA current with $V_{BUS\_IN}$ pin 238 at approximately 5V during detach condition due to power loss.

Figure 6:
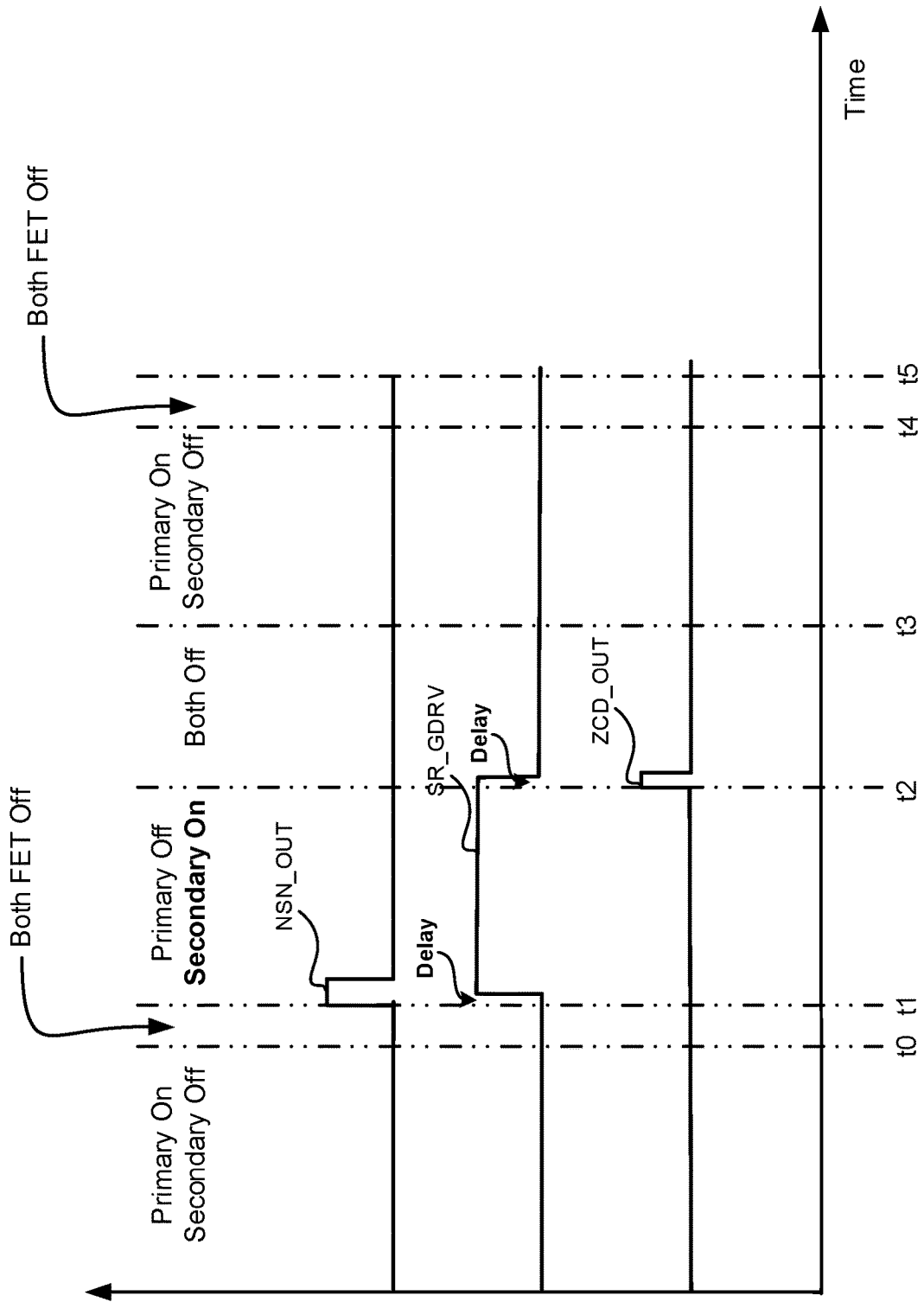
FIG. 6 is a graph showing signals on a gate of a SR, NSN_OUT node, and ZCD_OUT node of the SR sense block over time in the circuit of FIG. 2E when operated by the method of FIG. 3.

FIG. 6 is a graph showing signals on a gate 226b of SR 226, NSN_OUT node, and ZCD_OUT node over time in AC-DC converter 200 of FIG. 2E when operated by the method depicted in FIG. 3, or similar methods. As previously explained, reference voltage (Vtnesn) may be defined to desired negative or low voltage trip point at which the controller needs to turn-on the SR 226 through SR_GDRV pin 226b (at t1) during the NSN detection phase. Once the voltage at SR_SNS pin 228 dips below Vtensn, NSN block 288 may generate NSN_OUT signal (NSN detected) at t1 to turn-on SR 226. Correspondingly, the voltage at the SR drain node 226a may reach a negative or low tripping voltage, such as −0.7V as shown in FIG. 5. In one embodiment, SR 226 should be turned on instantly to avoid any delay. Circuit in the secondary-side 208 of AC-DC converter 200 carries a high current once the voltage at SR drain node 226a dips towards the negative voltage (e.g. −0.7V) at or around t1. Any delay in turning on SR 226 may cause efficiency loss of AC-DC converter 200. Referring to FIG. 6, during the ZCD detection phase, ZCD block 286 may generate ZCD_OUT signal when zero current or voltage is detected across SR 226. The ZCD_OUT signal may then turn the SR 226 off by disabling the SR_GDRV signal. In one embodiment, the disabling of SR 226 at or around t2 is preferably swift or virtually instant to avoid cross conduction of AC-DC adapter 200. In one embodiment, internal rectifier 248, as shown in FIG. 2E, may be a passive diode, such as a P-N junction diode. Internal rectifier 248 may block the path including internal resistive element 246 to ground when the voltage at SR drain node 226a dips below 0V or close to 0V or the threshold voltage of the passive diode, e.g. 0.7V (at or around time 504 in FIG. 5). The disabling or disconnection to ground of internal rectifier 248 may cause delay between signals at SR drain node 226a and SR_SNS pin 228 because the discharge of SR_SNS pin 228 may then be required to go through a path with high resistance. As a result, it may contribute to delays in turning on and/or off of SR 226 at or around t1 and/or t2, respectively. In one embodiment, the addition of voltage divider 230 including internal rectifier 248, as depicted in FIG. 2E, along with the chip parasitic capacitance may further adversely affect the delay of turning on and/or off of SR 226, contributing to efficiency loss and possibly cross conduction of AC-DC converter 200. Therefore, there is a need to address the aforementioned power loss during detach condition, and efficiency loss and cross conduction due to SR 226 switching delays.

Figure 7A:
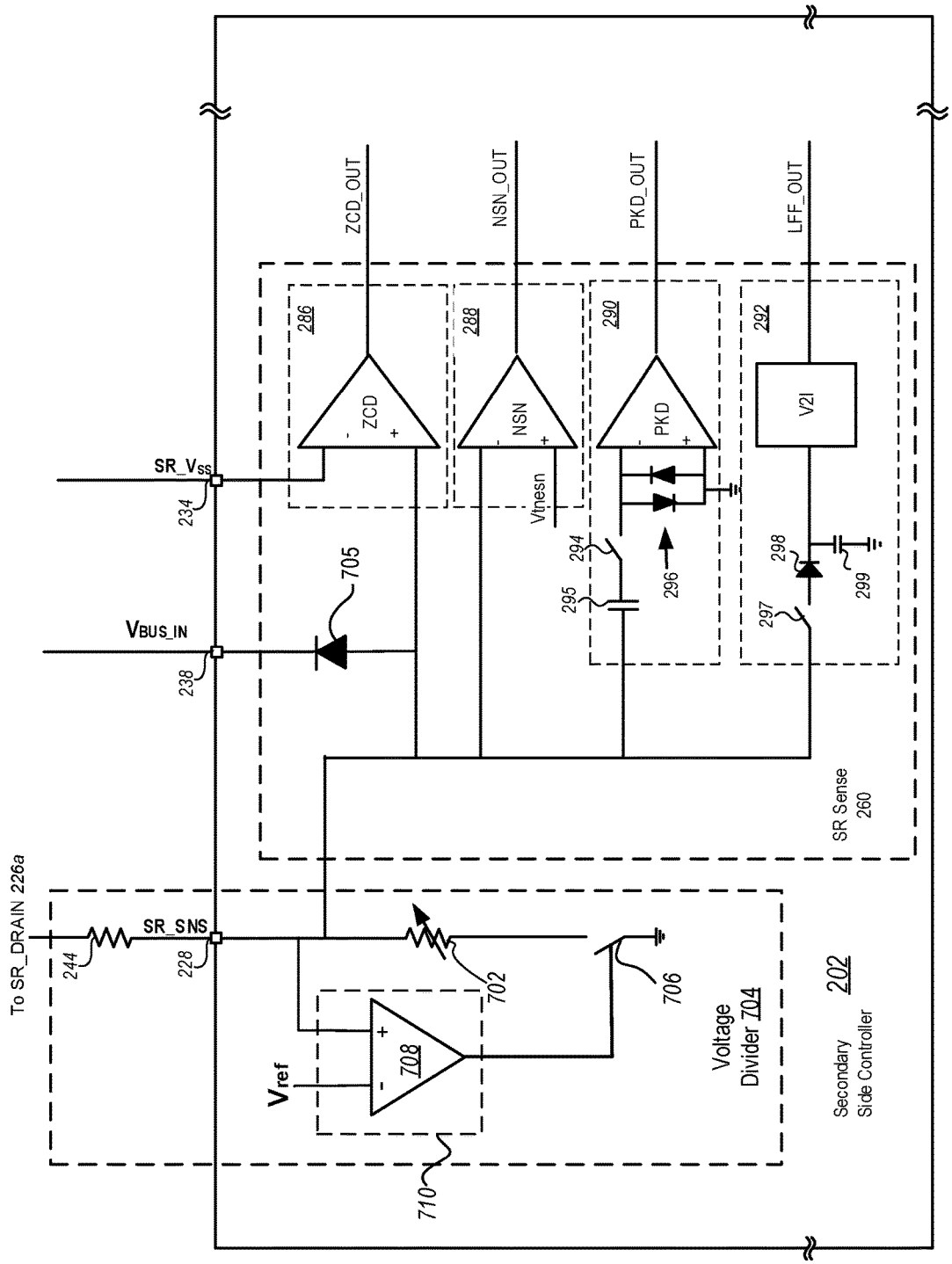
FIG. 7A is a schematic block diagram depicting of a portion of the secondary-side controller of FIG. 2B depicting an embodiment of the SR sense block and voltage divider in accordance with the present disclosure.

FIG. 7A is a schematic block diagram depicting of a portion of the secondary-side controller depicting an embodiment of the SR sense circuit 260 and voltage divider 704 in accordance with the present disclosure. In one embodiment, connections between voltage divider 704 to secondary-side 208 and SR sense circuit 260 including ZCD block 286, NSN block 288, PKD block 290, and LFF block 292 are similar to those depicted in FIG. 2E and its corresponding description. The voltage divider 704 includes an external resistive element 244, an internal resistive element 702, an active diode 710, and a switch 706. A resistance value of external resistive element 244 may be fixed by the manufacturer of the AC-DC converter 200 and is selected based on an expected maximum voltage on the drain node 226a based on the maximum AC voltage input, and turn-ratio of the transformer 204 to limit a maximum voltage on the SR_SNS pin 228 to enable the secondary-side controller 202 to be made with non-high voltage devices, made using standard, low voltage technologies. Suitable values for the resistance of the external resistive element 244 are from about 4KΩ to about 10 KΩ, such as 5 KΩ to ensure the voltage at SR_SNS pin 228 is capped at below 20V-22V to protect secondary-side controller 202 from possible high voltage from SR drain node 226a.

In one embodiment, voltage divider 704 may not include any passive or P-N junction diode, such as internal rectifier 248 in FIG. 2E. In one embodiment, implementation of a P-N junction diode in a CMOS process may create parasitic BJT junctions with the substrate that may result in a latch up issue. Instead, active diode 710 that includes comparator 708 may be coupled to SR_SNS pin 228 to ensure that when the voltage at SR drain node 226a approaches ground or 0V, during negative sensing or zero-crossing sensing operations, there is substantially no current flow through the voltage divider 704, thereby allowing the full, undivided voltage on the drain node 226a to be coupled to the SR_SNS pin 228 and sensed without any attenuation. Since there is no passive diode in this embodiment, the threshold voltage drop of the diode does not come into picture. Instead, the switch may be opened whenever the voltage on SR_SNS pin reaches the programmable reference threshold (Vref). This threshold voltage can be very close to ground, helping the SR_SNS pin to discharge quickly compared to a passive diode which helps in improvement in efficiency. In one embodiment, active diode 710 may include a comparator 708 having a non-inverting input coupled through SR_SNS pin 228 and an inverting input coupled to a programmable reference voltage (Vref). The comparator 708 may be configured to generate a switch control signal by comparing the voltage at SR_SNS pin 228 and Vref. In one embodiment, the switch control signal may be coupled to control the operation of switch 706 directly. When SR_SNS voltage is greater than Vref, switch control signal may turn switch 706 on such that internal resistive element 702 is enabled (ON) to ensure the voltage at SR_SNS pin 228 is capped at around 20V-22V. The divided voltages may be provided for LFF sensing operation (e.g. t3 to t4 in FIG. 5) or a beginning portion of NSN sensing operation, when the voltage at SR drain node 226a is high above 0V. When SR_SNS 228 voltage drops below Vref, switch control signal may turn switch 706 off such that internal resistive element 702 is disabled or blocked. In one embodiment, the full, undivided voltages may be provided for ZCD sensing or NSN sensing when SR drain 226a voltage is approaching ground or 0V, resulting in good signal to noise ratio (SNR) and sensing accuracy. In one embodiment, Vref may be determined and fixed by the manufacturer based on design and operational requirements, among other parameters. Alternatively or additionally, Vref may be programmable by users. In general, Vref may be determined such that switch 706 is off or disabled when the voltage at SR_SNS pin 228 approaches 0V to allow unattenuated NSN sensing and ZCD sensing operations. As a result, possible delays in switching SR 226 on (at or around t1) may be reduced or eliminated.

Figure 7B:
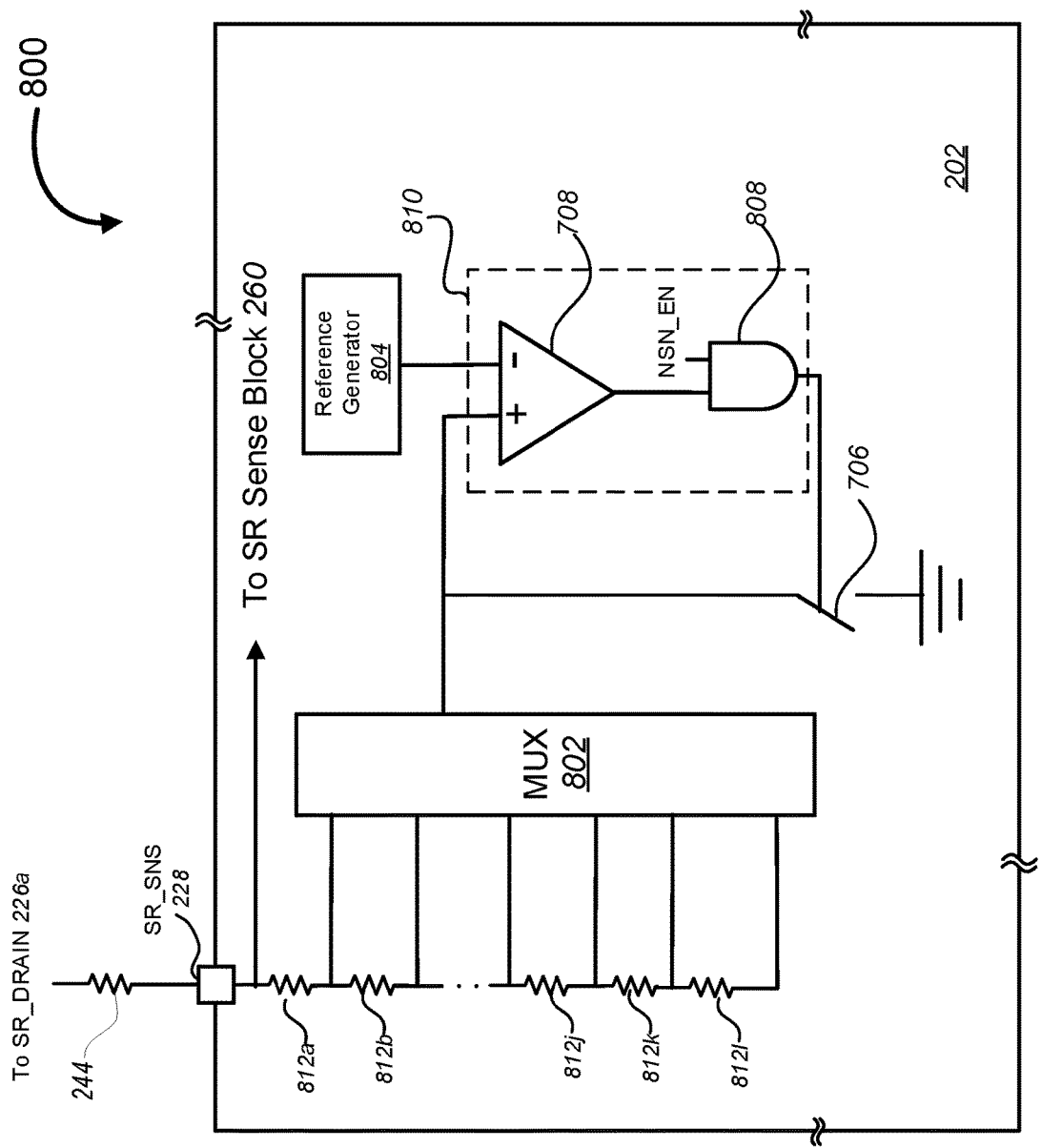
FIG. 7B is a schematic block diagram depicting a portion of the voltage divider in accordance with the present disclosure.

FIG. 7B is a schematic block diagram depicting an embodiment of implementation of voltage divider 800 in accordance with the present disclosure. Connections between voltage divider 800 to SR sense circuit 260 including ZCD block 286, NSN block 288, PKD block 290, and LFF block 292 are similar to those depicted in FIGS. 2E and 7A and their respective corresponding description. In one embodiment, voltage divider 800 includes reference generator 804, comparator 708, logic gate 808, switch 706, mux 802, and resistor ladder including resistors 812a to 812l.

The internal resistive element 246 or 702, shown schematically as a variable resistance in FIGS. 2A and 7A, may have a resistance value set by the manufacturer at the time the AC-DC converter is manufactured based on either desired input or output voltages, or to compensate for variations in parameters of the IC or other components in the AC-DC converter, such as 2 KΩ. Alternatively or additionally, the resistance value of the internal resistive element 702 can be dynamically adjusted by a calibration circuit in the AC-DC converter or secondary-side controller, either at start-up or powering on of the AC-DC converter, or periodically thereafter. One of the implementations of internal resistive element 702 having variable resistance value may be achieved through using a resistor ladder and a mux circuit, as best shown in FIG. 7B. In one embodiment, mux 802 may include a plurality of multiplexors that connect one or more of resistors 812a to 812l to adjust the overall resistance of internal resistive element 702. In one embodiment, a control signal (not shown in FIG. 7B) may be coupled to mux 802 to adjust the overall resistance of internal resistive element 702. It will be the understanding that the resistor ladder may include any number of resistors 812a to 812l with variable resistance values according to design and operational requirements.

In one embodiment, the output of mux 802 may be coupled to a non-inverting input of comparator 708 and an inverting input of comparator 708 is coupled to reference generator 804 to receive Vref Similar to the embodiment depicted in FIG. 7A, Vref may be fixed by the manufacturer or programmable through reference generator 804. Alternatively, the non-inverting input of comparator 708 may be coupled to SR_SNS pin 228 instead (not shown in FIG. 7B), similar to the configuration depicted in FIG. 7A. When the non-inverting input of comparator 806 (either voltage through mux 802 or SR_SNS pin 228) is greater than Vref, an enabling signal will be outputted to turn on switch 706. When Vref is greater and the comparing result is the opposite, comparator 708 may output a disabling signal to turn off switch 706, similar to the embodiment depicted in FIG. 7A. Optionally, active diode 810 may also include logic gate 808, as best shown in FIG. 7B. Comparator 708 may be coupled to one of the inputs of logic gate 808, which may take an AND gate form. In one embodiment, the other input of logic gate 808 may be coupled to receive the NSN_EN (NSN enable signal) such that the output signals of comparator 708 are only coupled to control switch 706 during NSN sensing operations. In one embodiment, switch 810 may be configured to be on or closed during LFF sensing operations and off or opened during ZCD sensing operations.

The voltage divider scheme, depicted in FIGS. 7A and 7B, using an active diode 710, 810 instead of a passive diode may help in reducing the sensing delay between SR_drain node 226a and SR_SNS pin 228 by activating a lower resistance path for discharging as Vref for operating switch 706 may be programmed. The reduction of delays in NSN detection may be as high as 50%, which may in turn reduce the efficiency loss of AC-DC converter 200 significantly.

Figure 8:
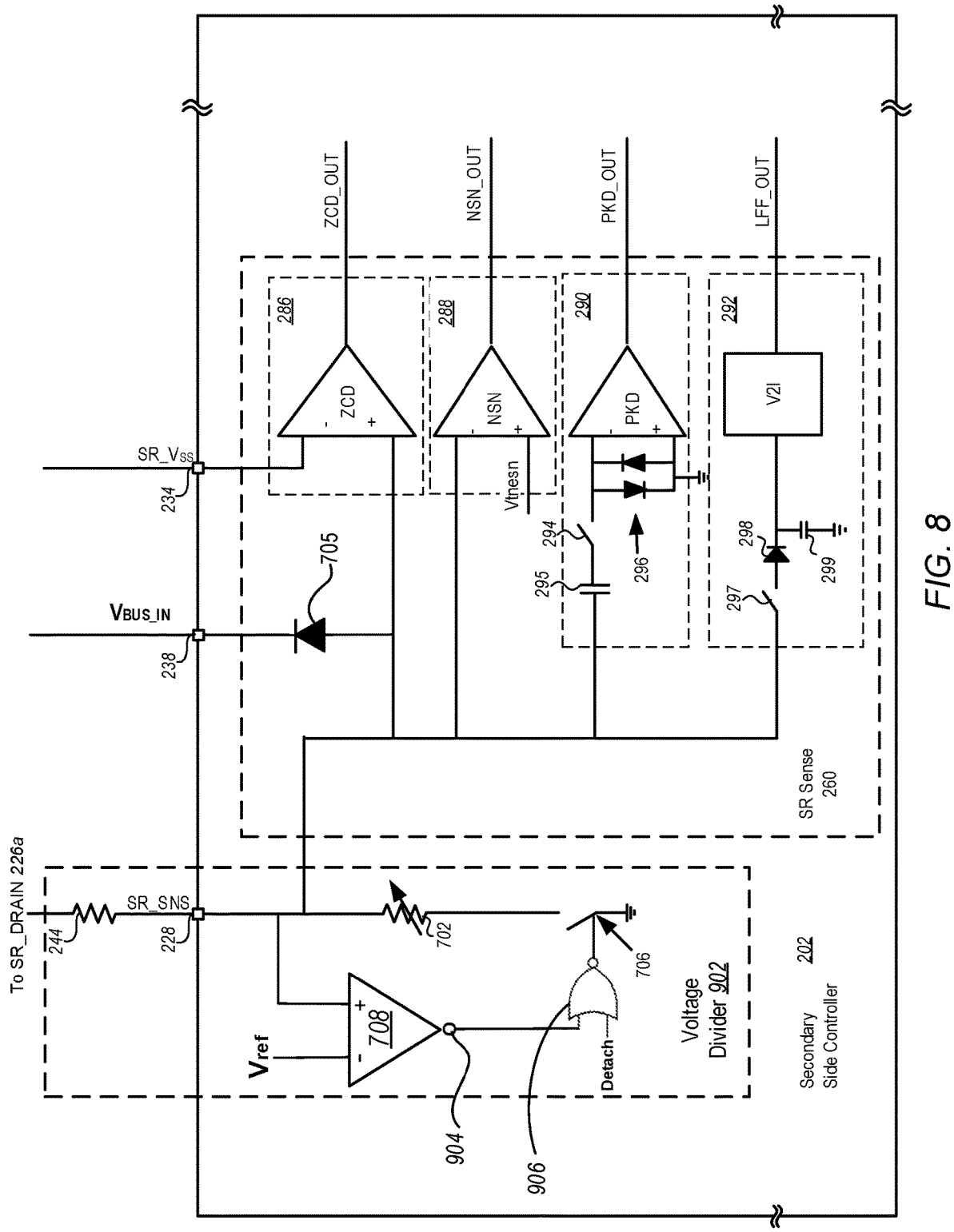
FIG. 8 is a schematic block diagram depicting of a portion of the secondary-side controller of FIG. 2B depicting an embodiment of the SR sense block and voltage divider in accordance with the present disclosure.

FIG. 8 is a schematic block diagram depicting of a portion of the secondary-side controller depicting an embodiment of the SR sense circuit 260 and voltage divider 902 in accordance with the present disclosure. As previously mentioned, besides reduction of efficiency loss and cross conduction due to sensing delays, it may also be critical to reduce power loss when AC-DC converter, such as AC-DC converter 200, is in detach condition. Referring to FIG. 8, voltage divider 902 may have a similar configuration as voltage dividers 704 in FIG. 7A or 800 in FIG. 7B, wherein an active diode is utilized instead of a passive diode. In one embodiment, an inverted output, using inverter 904, of comparator 708 is coupled to one of the inputs of logic gate 906, which may take the form of a NOR gate. The other input of logic gate 906 may be coupled to receive a DETACH signal, which may indicate that the AC-DC converter 200 is not electrically attached (detach) to any device or load. In one embodiment, the logic operation of the NOR gate 904 may ensure that switch 706 is only ON (logic value: 1) when both SR_SNS pin 228 voltage is greater than Vref (inverted logic value of comparator 708: 0) and AC-DC converter is NOT in detach condition (logic value: 0). In other words, switch 706 is always OFF (logic value: 0) whenever AC-DC converter 200 is in detach condition (logic value: 1), regardless of the voltage at SR drain node 226a. In one embodiment, internal resistive element 702 is only enabled when SR 226 functions are required (i.e. during attach condition) to avoid quiescent current consumption to ground during detach condition. In one embodiment, DETACH signal may be provided to NOR gate 904 through AC-DC converter 200, as depicted in FIG. 2B. In one embodiment, one of the cc pins (CC1 or CC2) at its USB Type-C receptacle sense specified resistance to ground then USB-PD controller senses attach condition. As a result, the DETACH signal may be generated correspondingly. It will be the understanding that the shown combination of an inverted comparator and NOR gate is only one example of achieving the aforementioned logic result to operate switch 706, and should not be construed as limitation.

Utilizing voltage divider without any passive diode, as explained in FIGS. 7A, 7B, and 8 may help limit the maximum voltage at SR_SNS pin 228 at or around 20V-22V to protect secondary-side controller 202 of AC-DC converter 200. During power-up of AC-DC converter 200, when none of the circuit is active, the IC may still be protected from high voltage. In embodiments depicted in FIGS. 7A, 7B, and 8, the passive diode is replaced with a switch and an active diode embodiment. In one embodiment, switch 706 may be either on or off during power-up. To protect the IC from higher voltage during power-up, a diode 705 is incorporated between SR_SNS pin 228 (anode of diode 705) and $V_{BUS\_IN}$ pin 238 (cathode of diode 705). Diode 705 may help limit the voltage on SR_SNS pin 228 at power-up as max voltage allowed on Vbus is at or around 21V. The current may also be limited by the external resistive element 244 between SR_SNS pin 228 and drain node 226a of SR 226 during power-up and/or fault condition.

Figure 9:
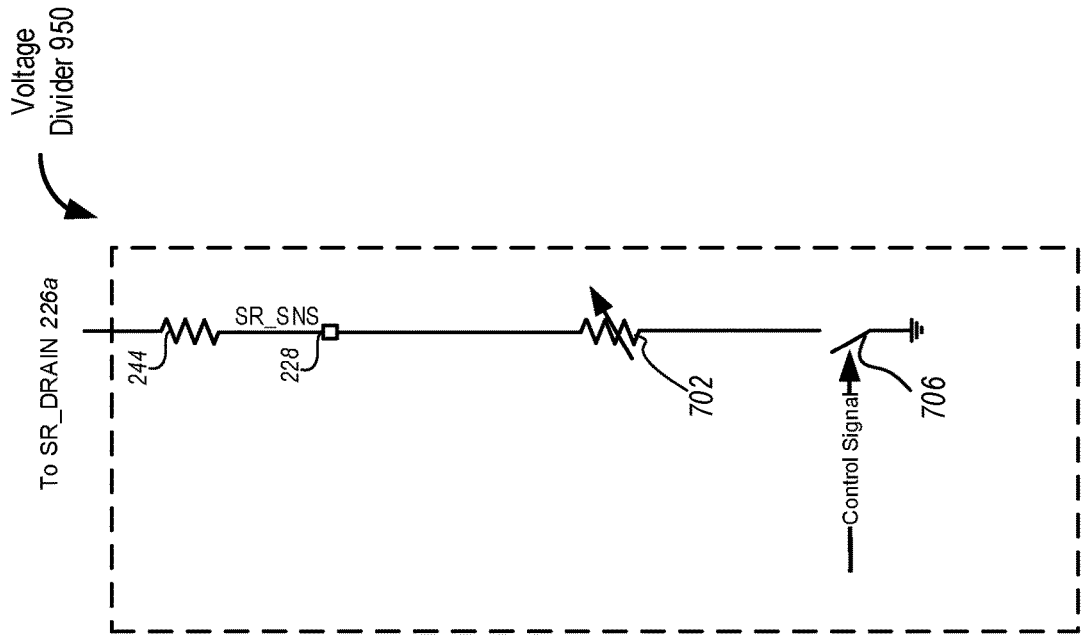
FIG. 9 are schematic block diagrams depicting two alternative embodiments of a portion of the voltage divider in accordance with the present disclosure.
Figure 9:
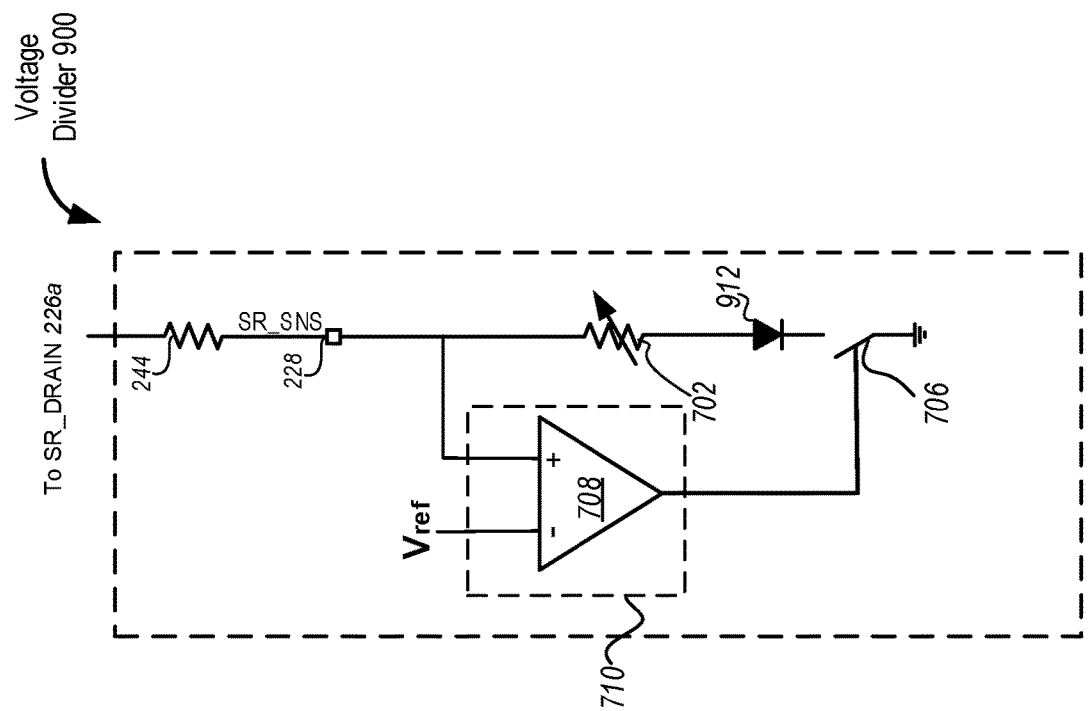

FIG. 9 illustrates a pair of schematic block diagrams depicting two alternative embodiments of a portion of the voltage divider in accordance with the present disclosure. In one embodiment, voltage divider 900 includes external resistive element 244, internal resistive element 702, passive diode 912, and switch 706 connected in series to ground. Similar to the embodiments disclosed in FIGS. 7A, 7B, and 8, switch 706 may be controlled by active diode 710 according to the comparison result between Vref and the voltage at SR_SNS pin 228. In another embodiment, voltage divider 950 does not include any active or passive diode. As best shown in FIG. 9, voltage divider 950 includes external resistive element 244, internal resistive element 702, and switch 706 connected in series to ground. In one embodiment, switch 706 may be controlled by a control signal received through another portion of secondary-side controller 202. One of the possibilities of the control signal may be the DETACH signal to avoid power loss during detach condition.

Figure 10:
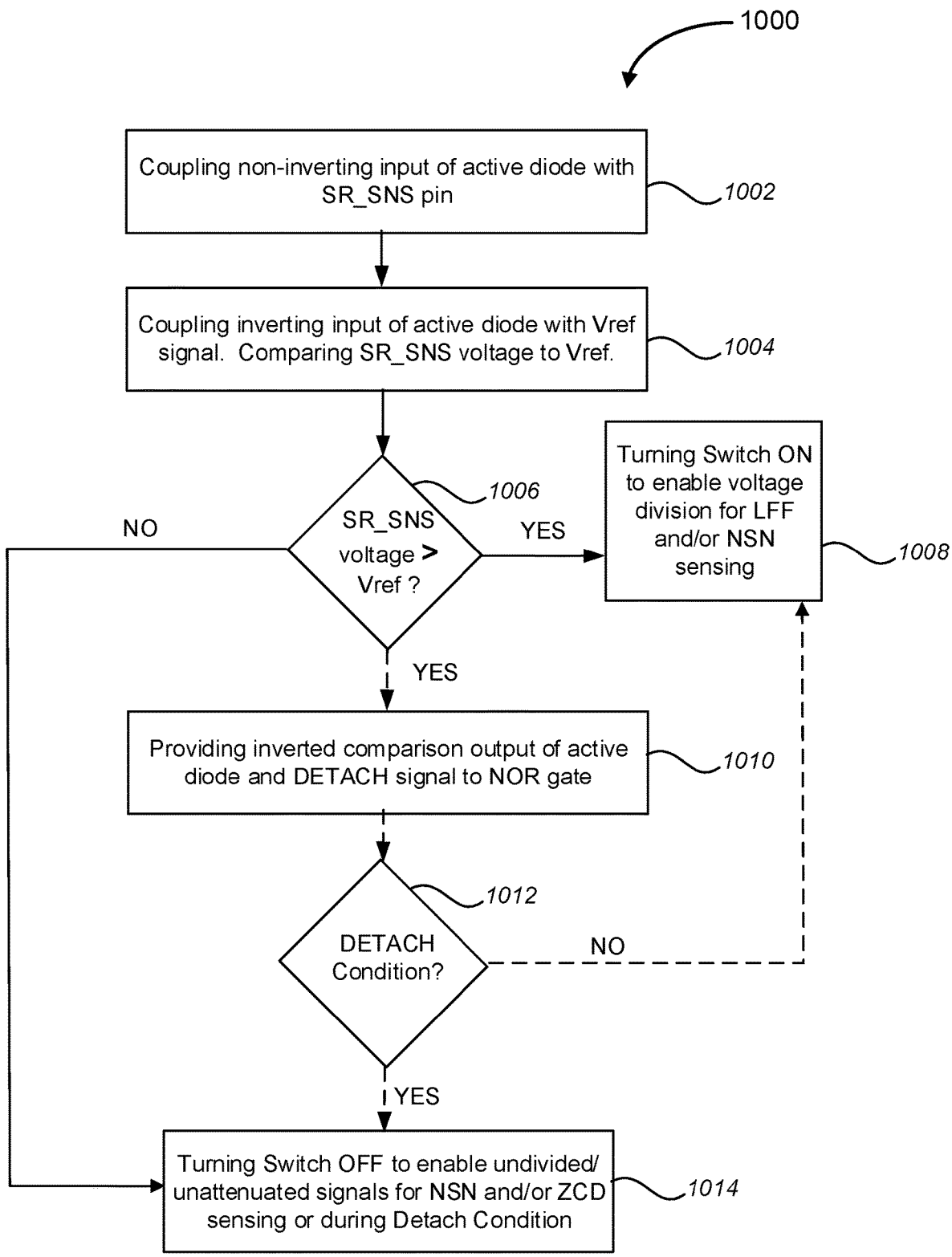
FIG. 10 is a flowchart illustrating an embodiment of a method for operating an AC-DC converter including a secondary-side controller and SR architecture in accordance with the present disclosure.

A method of operating a voltage divider of an AC-DC converter having a secondary-side controller including an IC having a single SR_SNS pin through which the IC is coupled to the drain of a SR through a voltage divider will now be described with reference to the flowchart of FIG. 10, and the embodiments of FIGS. 7A, 7B, and 8. Referring to FIG. 10, the method of operating a voltage divider 1000 begins with step 1002, in which the voltage/signal at SR_SNS pin 228 (in FIGS. 7A and 8) is coupled to a non-inverting input of comparator 708, which may be a portion of an active diode. Alternatively, the non-inverting input of comparator 708 may be coupled to an output node of an internal resistive element, such as resistor ladder 812a-812l and mux 802 in FIG. 7B. Next, a reference voltage Vref, which may be generated in reference generator, such as reference generator 804 in FIG. 7B, is coupled to an inverting input of comparator 708 of the active diode. As previously described, Vref may be fixed by the manufacturer or programmable. Then, the voltage at SR_SNS pin 228 is compared to Vref, in step 1004.

Next, referring to FIGS. 10, 7A, and 7B, the output signal of active diode 710 may be utilized to control the operation of switch 706 directly. A check is performed and it is determined if the voltage at SR_SNS pin 228 is greater than Vref (in step 1006), switch 706 may be turned on to enable voltage division by internal resistive element 702, in step 1008. In one embodiment, the divided voltage may be provided for LFF sensing or a portion of NSN sensing wherein voltage at SR drain node 226a may be significantly higher than 0V. It is also determined than if the voltage at SR_SNS pin 228 is less than Vref (in step 1006), a control signal from active diode 710 may be coupled to switch 706 to turn it off or opened. In one embodiment, internal resistive element 702 may be disabled and the full undivided voltage from SR-SNS pin 228 may be provided for ZCD and/or NSN sensing without attenuation, in step 1014.

Optionally or additionally, the operation method 100 may address power loss issue during detach condition of AC-DC converter 200. Next, referring to FIGS. 10 and 8, an inverted output signal from comparator 708 may be coupled to an input of NOR gate 904, in step 1010. In one embodiment, a DETACH signal verifying AC-DC converter is in detach condition is provided to another input of NOR gate 904, in step 1010. In one embodiment, the DETACH signal may be generated by secondary-side controller 202, as best shown in FIG. 2B. In one embodiment, one of the cc pins (CC1 or CC2) at its USB Type-C receptacle sense specified resistance to ground then USB-PD controller senses attach condition. As a result, the DETACH signal may be generated correspondingly.

Next, a check is performed on the presence of detach condition, using the DETACH signal. It is determined that if AC-DC converter is "NOT in detach condition" (i.e. AC-DC converter attached and SR functions are needed) AND voltage at SR-SNS pin 228 is greater than Vref, switch 706 is turned on or closed, such that internal resistive element 702 is enabled, in step 1008. It is also determined that, regardless of the result of SR_SNS voltage and Vref comparison, if AC-DC converter is in detach condition, switch 706 will be turned off or opened to disable internal resistive element 702 and to reduce power loss, in step 1014.

Thus, an AC-DC converter with secondary side control, and SR architecture, and methods for operating the same have been disclosed. Embodiments of the present invention have been described above with the aid of functional and schematic block diagrams illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

It is to be understood that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. A secondary-side controller for an AC-DC converter, comprising:
a single synchronous rectifier sensing (SR_SNS) terminal, coupled to a synchronous rectifier (SR) of the AC-DC converter, having a maximum input voltage significantly less than an SR drain voltage; and
a voltage divider circuit coupled to the single SR_SNS terminal configured to provide signals to a sensing circuit, the voltage divider including an active diode, an internal resistive element, and a switch, wherein the active diode is configured to control the switch to enable or disable the internal resistive element based on a comparison result of a voltage at the single SR_SNS terminal and a reference voltage, wherein the internal resistive element is coupled in series to ground through the switch, and wherein the switch is configured to disable voltage division during negative-sensing and zero-crossing detection in the secondary-side controller.

2. The secondary-side controller of claim 1, wherein the active diode is further configured to disable the internal resistive element when the AC-DC converter is in detach condition, in which the AC-DC converter is not electrically coupled to any load through a universal serial bus (USB) Type-C connector.

3. The secondary-side controller of claim 2, wherein the active diode further includes a NO logic function, wherein an inverted output signal of a comparator and a detach signal are coupled to two inputs of the NOR logic function, and wherein output signals of the NOR logic function are configured to control operation of the switch.

4. The secondary-side controller of claim 1, wherein the active diode includes a comparator and wherein:
the comparator is configured to provide an enabling signal to the switch when the voltage at the single SR_SNS terminal is greater than the reference voltage; and
the comparator is configured to provide a disabling signal to the switch when the voltage at the single SR_SNS terminal is less than the reference voltage.

5. The secondary-side controller of claim 1, wherein the sensing circuit includes a zero-crossing detector (ZCD) block, a negative-sensing (NSN) block, a peak-detector (PKD) block, and a line-feed-forward (LFF) block integrally formed thereon, and wherein the ZCD, PKD, NSN, and LFF blocks are coupled to a drain of the SR through the single SR_SNS terminal.

6. The secondary-side controller of claim 5, wherein:
the PKD block comprises a PKD comparator coupled to the single SR_SNS terminal through an internal capacitor to detect a peak voltage on the single SR_SNS terminal without any clipping of the peak voltage, and is configured to generate a PKD_OUT signal which is processed and sent to a primary side controller to turn on a power switch (PS) coupled between an AC input and the primary side of a transformer to enable a valley switching mode of operation;
the ZCD block comprises a ZCD comparator coupled between the single SR_SNS terminal and a negative terminal of a DC output of the AC-DC converter, the ZCD comparator configured to generate a zero current signal to turn off the SR when zero voltage is sensed on the single SR_SNS terminal crossing without any voltage division;
the NSN block comprises an NSN comparator coupled to the single SR-SNS terminal to detect a negative voltage crossing without the any voltage division, the NSN comparator configured to generate a signal for turning on the SR; and
the LFF block comprises a voltage-to-current (V2I) block coupled to the single SR-SNS terminal to detect a proportional AC Line in voltage with a voltage division, and the proportional AC Line in voltage is used to alter that parameters of the AC-DC converter to improve efficiency and performance.

7. The secondary-side controller of claim 1, wherein the voltage divider circuit does not include any passive diode including a P-N junction diode.

8. The secondary-side controller of claim 1, wherein the voltage divider circuit further comprises an external resistance element coupling between the single SR_SNS terminal to the drain of the SR, wherein the external resistance element is disposed outside the secondary-side controller.

9. The secondary-side controller of claim 8, wherein the external resistive element has a resistance value based on an AC input voltage to a primary side of a transformer of the AC-DC converter and a turn-ratio of the transformer and the maximum input voltage to the single SR_SNS terminal of less than 20V.

10. The secondary-side controller of claim 1, wherein a passive diode is disposed between the single SR_SNS terminal and a VBUS_IN terminal, wherein the passive diode is configured to limit the voltage at the single SR_SNS terminal during power-up of the AC-DC converter.

11. The secondary-side controller of claim 1, wherein the reference voltage is programmable.

12. A method of operating a secondary-side controlled AC-DC converter, comprising:
 sensing a voltage on a drain of a synchronous rectifier (SR) coupled to a secondary side of a transformer with the secondary-side controller comprising an integrated circuit (IC) including a single synchronous rectifier sensing (SR_SNS) terminal through which the IC is coupled to the drain of the SR;
 sensing the voltage on the drain of SR through the single SR_SNS terminal;
 coupling the single SR_SNS terminal to ground through a voltage divider circuit including an active diode, an internal resistive element, and a switch;
 disabling the internal resistive element, using the active diode and the switch, when a voltage at the single SR_SNS terminal is determined to be less than a reference voltage, wherein disabling the internal resistive element includes sensing an undivided voltage during negative-sensing and zero-crossing detector sensing operation without attenuation; and
 disabling the internal resistive element, using the active diode and the switch, when the AC-DC converter is in detach condition.

13. The method of claim 12, further comprising:
 enabling the internal resistive element, using the active diode and the switch, when the voltage at the single SR_SNS terminal is determined to be greater than the reference voltage and the AC-DC converter is in attach condition.

14. The method of claim 13, wherein enabling the internal resistive element includes sensing a divided voltage at the single SR_SNS terminal during line-feed-forward sensing operation.

15. The method of claim 12, wherein the reference voltage is programmable.

16. A system comprising:
 a transformer including a primary side coupled to receive a rectified AC input, and a secondary side coupled to a DC output and having a synchronous rectifier (SR) coupled between the DC output and the secondary side; and
 a secondary-side controller including an integrated circuit (IC), and a plurality of terminals through which the IC is coupled to the secondary side of the transformer, the plurality of terminals including a single synchronous rectifier sensing (SR_SNS) terminal through which the IC is coupled to a drain of the SR to sense voltage on the drain of the SR, wherein the single SR_SNS terminal is coupled to the drain of the SR and a sensing circuit through a voltage divider circuit, the voltage divider circuit including an active diode, an internal resistive element, and a switch, wherein the active diode is configured to control the switch to enable or disable the internal resistive element based on a comparison result of a voltage at the single SR_SNS terminal and a reference voltage, wherein the internal resistive element is coupled in series to ground through the switch, and wherein the switch is configured to disable voltage division during negative-sensing and zero-crossing detection in the secondary-side controller.

17. The system of claim 16, wherein the active diode is further configured to disable the internal resistive element when the system is in detach condition, in which the system is not electrically coupled to any load through a USB type-C connector.

18. The system of claim 16, wherein the voltage divider circuit further comprises an external resistance element coupling the single SR_SNS terminal to the drain of the SR.

19. The system of claim 16, wherein the sensing circuitry comprises a zero-crossing detector (ZCD) block, a negative-sensing (NSN) block, a peak-detector (PKD) block, and a Line-Feed-forward (LFF) block integrally formed on the IC.

* * * * *